(12) United States Patent
Chinchole et al.

(10) Patent No.: US 11,487,548 B2
(45) Date of Patent: Nov. 1, 2022

(54) DYNAMIC RE-EVALUATION OF PARAMETERS FOR NON-VOLATILE MEMORY USING MICROCONTROLLER

(71) Applicant: SanDisk Technologies LLC, Addison, TX (US)

(72) Inventors: Vijay Chinchole, Karnataka (IN); Nisha Padattil Kuliyampattil, Karnataka (IN); Sonam Agarwal, Karnataka (IN); Akash Agarwal, Karnataka (IN); Pavithra Devaraj, Karnataka (IN); Yan Li, Milpitas, CA (US)

(73) Assignee: SanDisk Technologies LLC, Addison, TX (US)

( * ) Notice: Subject to any disclaimer, the term of this patent is extended or adjusted under 35 U.S.C. 154(b) by 517 days.

(21) Appl. No.: 16/695,759

(22) Filed: Nov. 26, 2019

(65) Prior Publication Data

US 2021/0157607 A1 May 27, 2021

(51) Int. Cl.
*G11C 7/00* (2006.01)
*G06F 9/38* (2018.01)
*G06F 9/34* (2018.01)
*G06F 12/02* (2006.01)
*G06F 9/54* (2006.01)
(Continued)

(52) U.S. Cl.
CPC .......... *G06F 9/3895* (2013.01); *G06F 3/0607* (2013.01); *G06F 3/0659* (2013.01); *G06F 3/0679* (2013.01); *G06F 9/226* (2013.01); *G06F 9/34* (2013.01); *G06F 9/3802* (2013.01); *G06F 9/544* (2013.01); *G06F 11/3037* (2013.01); *G06F 12/0246* (2013.01)

(58) Field of Classification Search
CPC .... G06F 9/3895; G06F 3/0607; G06F 3/0659; G06F 3/0679; G06F 9/226; G06F 9/34; G06F 9/3802; G06F 9/544; G06F 11/3037; G06F 12/0246
USPC .................................................. 365/189.011
See application file for complete search history.

(56) References Cited

U.S. PATENT DOCUMENTS 7,613,045 B2   11/2009 Murin et al.
9,396,080 B2 *  7/2016 Malshe ................ G06F 11/076
(Continued)

*Primary Examiner* — Huan Hoang
*Assistant Examiner* — Minh Dinh
(74) *Attorney, Agent, or Firm* — Dickinson Wright PLLC; Steven C. Hurles

(57) ABSTRACT

A non-volatile memory apparatus and corresponding method of operation are provided. The apparatus includes non-volatile memory cells in an integrated circuit device along with a microcontroller in communication with the non-volatile memory cells. The microcontroller is configured to receive a memory operation command and in response, determine a condition value of one of a plurality of conditions associated with the memory operation command and whether the one of the plurality of conditions is dynamic. In parallel, the microcontroller determines and outputs an output value using the condition value. The microcontroller then determines whether the one the plurality of conditions has changed. If the one of the plurality of conditions is dynamic and has changed, the microcontroller determines an updated condition value and in parallel, compares the condition value and the updated condition value and determines and outputs an updated output value using the updated condition value and the comparison.

20 Claims, 10 Drawing Sheets

(51) Int. Cl.
    *G06F 11/30*         (2006.01)
    *G06F 9/22*          (2006.01)
    *G06F 3/06*          (2006.01)

(56)                 References Cited

U.S. PATENT DOCUMENTS

| | | |
|---|---|---|
| 9,698,676 B1 | 7/2017 | Huynh et al. |
| 2011/0134692 A1 | 6/2011 | Sharon et al. |
| 2018/0173447 A1* | 6/2018 | Chin .................. G06F 3/0619 |
| 2018/0357123 A1 | 12/2018 | Yin et al. |
| 2019/0018597 A1* | 1/2019 | Zhang ................ G06F 3/0688 |
| 2020/0065030 A1* | 2/2020 | Crawford, Jr. ....... G06F 3/0611 |

\* cited by examiner

DYNAMIC RE-EVALUATION OF PARAMETERS FOR NON-VOLATILE MEMORY USING MICROCONTROLLER

FIELD

This application relates to the operation of re-programmable non-volatile memory devices such as semiconductor flash memory, and, more specifically, to a non-volatile memory apparatus employing dynamic re-evaluation of parameters using a microcontroller.

BACKGROUND

This section provides background information related to the technology associated with the present disclosure and, as such, is not necessarily prior art.

A memory apparatus may have a state machine that controls certain operations of the memory device. However, once the state machine is "taped-out" and in production, minimal if any changes can be made to address errors or design defects, limiting development and testing flexibility without greatly extending the design cycle.

Accordingly, there is still a need for more improved non-volatile memory systems while providing adequate performance.

SUMMARY

This section provides a general summary of the present disclosure and is not a comprehensive disclosure of its full scope or all of its features and advantages.

An object of the present disclosure is to provide a non-volatile memory system and a method of operating a microcontroller of the non-volatile memory system that address and overcome the above-noted shortcomings.

Accordingly, it is an aspect of the present disclosure to provide an apparatus including a plurality of non-volatile memory cells in an integrated circuit device. The apparatus also includes a microcontroller in the integrated circuit device and in communication with the plurality of non-volatile memory cells. The microcontroller is configured to receive a memory operation command. In response to receiving the memory operation command, the microcontroller is configured to determine a condition value of one of a plurality of conditions associated with the memory operation command and whether the one of the plurality of conditions is dynamic. In parallel, the microcontroller is configured to determine and output an output value using the condition value. The microcontroller is then configured to determine whether the one of the plurality of conditions has changed. In response to determining the one of the plurality of conditions is dynamic and has changed, the microcontroller is configured to determine an updated condition value of one of the plurality of conditions identified as dynamic. In parallel, the microcontroller is configured to compare the condition value and the updated condition value and determine and output an updated output value using the updated condition value and the comparison of the condition value and the updated condition value.

According to another aspect of the disclosure, a controller in communication with a plurality of non-volatile memory cells of a non-volatile memory system is provided. The controller is configured to receive a memory operation command and monitor a plurality of conditions associated with the memory operation command. In response to receiving the memory operation command, the controller is configured to determine a condition value of one of a plurality of conditions and whether the one of the plurality of conditions is dynamic. The controller is also configured to determine and output an output value using the condition value during the determining of the condition value of one of the plurality of conditions and whether the one of the plurality of conditions is dynamic. The controller determines whether the one of the plurality of conditions has changed. In response to determining the one of the plurality of conditions is dynamic and has changed, the controller is configured to determine an updated condition value of one of the plurality of conditions identified as dynamic. During the determining of the updated condition value of the one of the plurality of conditions identified as dynamic, the controller is configured to compare the condition value and the updated condition value and determine and output an updated output value using the updated condition value and the comparison of the condition value and the updated condition value.

According to yet another aspect of the disclosure, a method of operating a microcontroller of a non-volatile memory system is also provided. The method includes the step of receiving a memory operation command. In response to receiving the memory operation command, the method proceeds by determining a condition value of one of a plurality of conditions associated with the memory operation command and whether the one of the plurality of conditions is dynamic. In parallel, the method includes the step of determining and output an output value using the condition value. The method continues with the step of determining whether the one the plurality of conditions has changed. In response to determining the one of the plurality of conditions is dynamic and has changed, the next step of the method is determining an updated condition value of one of the plurality of conditions identified as dynamic. In parallel, the method includes the steps of comparing the condition value and the updated condition value and determining and output an updated output value using the updated condition value and the comparison of the condition value and the updated condition value.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
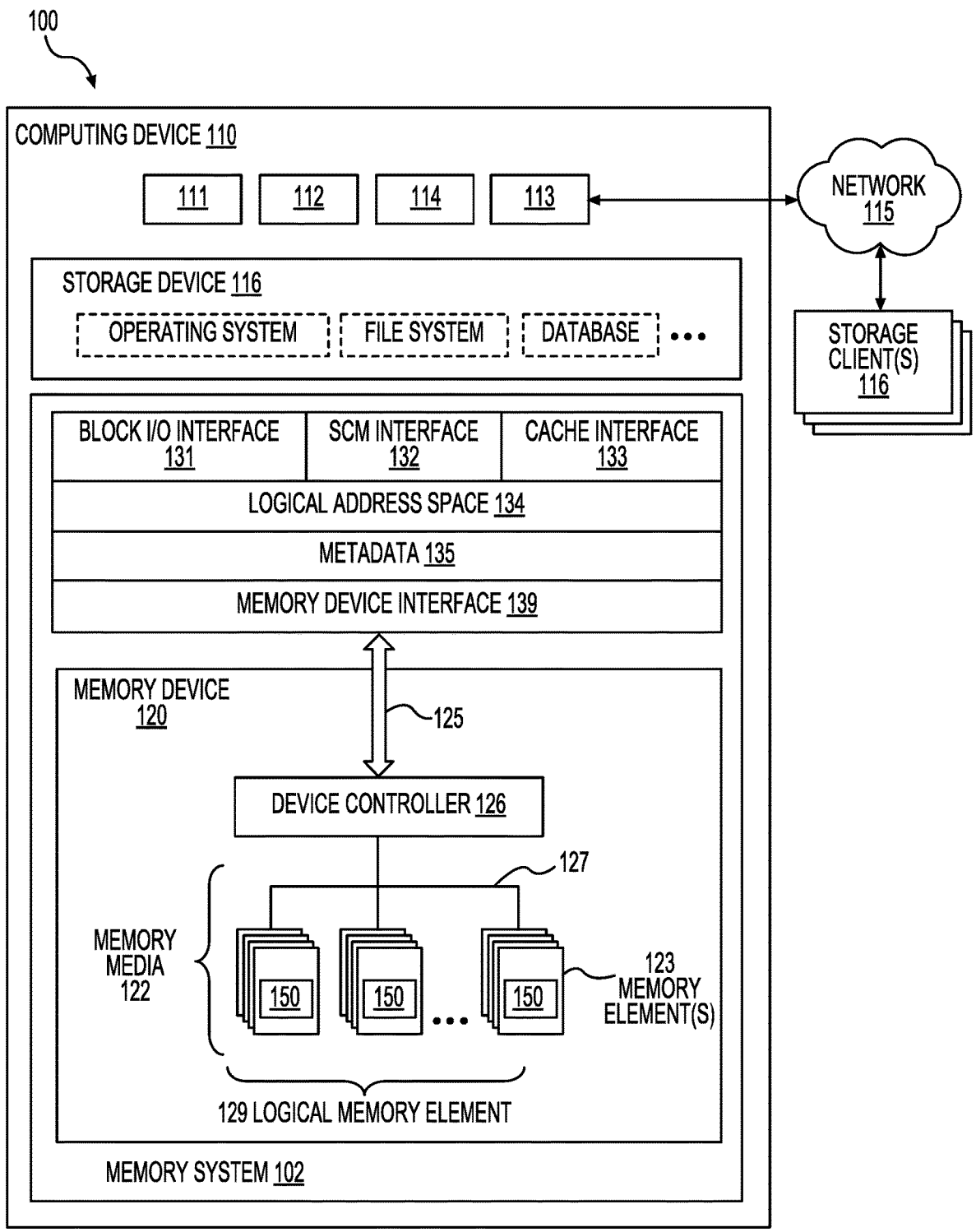
FIG. 1 is a schematic block diagram illustrating one embodiment of a system for an on-die memory microcontroller according to aspects of the disclosure.

In the following description, details are set forth to provide an understanding of the present disclosure. In some instances, certain circuits, structures and techniques have not been described or shown in detail in order not to obscure the disclosure.

In general, the present disclosure relates to a non-volatile memory apparatus of the type well-suited for use in many applications. The non-volatile memory apparatus and associated methods of operation of this disclosure will be described in conjunction with one or more example embodiments. However, the specific example embodiments disclosed are merely provided to describe the inventive concepts, features, advantages and objectives with sufficient clarity to permit those skilled in this art to understand and practice the disclosure. Specifically, the example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

In many non-volatile memory apparatuses, the controller for the apparatus is a combination and state machine-based design architecture which is good for Register-Transfer Level (RTL) design. Due to some unforeseen issues (e.g., arising from memory cells and device behavior), it may be necessary to make changes to the design. While the design can be parameterized for some level of flexibility, the number of parameters may be numerous and thus, all issues cannot be foreseen. For instance, after checking the final silicon, it is discovered that a normal program operation need more time to complete and consequently, the program pulse needs to be increased. To facilitate this, some signals at the sub-module level may be modified or changed, which will further affect the program timing or any other final output. After the non-volatile memory apparatus is fabricated, it is tested and matched with the expected behavior seen in the pre-silicon simulations. Any mismatch is debugged. Alternate changes are suggested to get the expected behavior.

Circuit Under Array (CuA) may also employed in non-volatile memory apparatuses to reduce the form factor. However, with CuA, it is very difficult to implement changes to the hardware of the non-volatile memory apparatus once the apparatus has been manufactured. In such a memory manufacturing process, tape-out can occur in two phases, AATO (Active area Tape-out) and MTO (Metal Tape-out). Some issues can be corrected even after the AATO using some dummy gates and re-routing the metal lines. Nevertheless, if a bug is found or the specification is modified after AATO/MTO, it may involve changing the Metal Layer mask for the chip fabrication.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "circuit," "module," "apparatus," or "system." Furthermore, aspects of the present disclosure may take the form of a computer program product embodied in one or more non-transitory computer readable storage media storing computer readable and/or executable program code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented at least partially in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may include a single instruction, or many instructions, and may even be distributed over several different code segments, among different programs, across several memory devices, or the like. Where a module or portions of a module are implemented in software, the software portions may be stored on one or more computer readable and/or executable storage media. Any combination of one or more computer readable storage media may be utilized. A computer readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object oriented programming language such as Python, Java, Smalltalk, C++, C#, Objective C, or the like, conventional procedural programming languages, such as the "C" programming language, scripting programming languages, and/or other similar programming languages.

The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

FIG. 1 is a block diagram of one embodiment of a system 100 for an on-die memory microcontroller 150. The system 100 comprises one or more microcontrollers 150 for memory media 122 of a non-volatile and/or volatile memory device 120. A microcontroller 150 may be part of a non-volatile and/or volatile memory element 123, and may be in communication with a non-volatile and/or volatile memory media controller 126, a device driver, or the like. In some embodiments, a microcontroller 150 may at least partially operate on and/or in communication with a non-volatile and/or volatile memory system 102 of a computing device 110, which may comprise a processor 111, volatile memory 112, and a communication interface 113. The processor 111 may comprise one or more central processing units, one or more general-purpose processors, one or more application-specific processors, one or more virtual processors (e.g., the computing device 110 may be a virtual machine operating within a host), one or more processor cores, or the like. The communication interface 113 may comprise one or more network interfaces configured to communicatively couple the computing device 110 and/or memory controller 126 to a communication network 115, such as an Internet Protocol (IP) network, a Storage Area Network (SAN), wireless network, wired network, or the like.

A microcontroller 150, as used herein, comprises one or more circuits or other logic hardware of an integrated circuit device, such as a die and/or chip 123 of memory media 122 (e.g., a memory element 123 or other integrated circuit device). For example, in one embodiment, a microcontroller 150 may comprise synthesizable logic (e.g., defined in a hardware description language such as Verilog, VHSIC hardware description language (VHDL), or the like; a gate-level netlist; a soft core; and/or another logic design) placed and/or routed onto a programmable logic device such as a field programmable gate array (FPGA), manufactured as an application specific integrated circuit (ASIC) device; and/or another integrated circuit device 123. In a further embodiment, a microcontroller 150 may comprise analog and/or mixed-signal logic (e.g., defined and/or designed in a transistor-layout format, an ASIC, discrete logic components, a hard core, and/or another integrated circuit device 123).

A microcontroller 150 may perform and/or control one or more tasks for a memory element 123 of memory media 122, such as management functions or the like. A microcontroller 150 may comprise one or more processing units, processing cores, or the like that process and/or execute microcode or other computer executable code (e.g., an instruction set) to perform tasks or operations. In this manner, instead of or in addition to manufacturing a new integrated circuit device or upgrading firmware, one or more functions and/or tasks of a microcontroller 150 may be updated by changing and/or updating microcode or other computer executable code of the microcontroller 150. A microcontroller 150 may comprise volatile and/or non-volatile memory or storage, which the microcontroller 150 may use to store microcode, to store data for and/or from an array of memory media 122, to store settings and/or configuration parameters, or the like.

In certain embodiments, the memory device 120 and/or the memory elements 123 may be used in a variety of applications and/or environments. In order to properly function in various temperatures and other environmental conditions, a clock rate of a microcontroller 150 and/or of a memory element 123 may be set artificially low, to improve stability, reliability, or the like in a wide range of operating conditions. For example, in various embodiments, a clock rate for a microcontroller 150 may be set less than about 50 MHz, less than about 40 MHz, less than about 30 MHz, less than about 20 MHz, less than about 15 MHz, about 14 MHz, about 13.5 MHz, about 13 MHz, about 12.5 MHz, about 12 MHz, less than about 12 MHz, or the like.

However, such a low clock rate for a microcontroller 150, in certain embodiments, may be set lower than a clock rate at which the microcontroller 150 can perform data operations for the memory media 122 using a single processing unit without increasing a latency of the data operations (e.g., a single processing unit or core may not be fast enough at the clock rate or frequency to read data from and/or write data to the non-volatile memory medium 123 without slowing down the read and/or write operations, causing the microcontroller 150 to become a bottleneck, or the like). A microcontroller 150, in one embodiment, may include, be associated with, and/or have access to a plurality of processing units and/or cores that perform different categories and/or portions of tasks for an array of memory media 122 in parallel (e.g., to reduce and/or eliminate an effect of a slow microcontroller clock rate on access latency for the memory media 122, or the like).

A processing unit, as used herein, comprises a sub-block and/or component associated with one or more microcontrollers 150 and capable of executing and/or processing one or more commands and/or instructions (e.g., microcode, an instruction set, or the like). A processing unit may be part of a microcontroller 150, may be shared by multiple microcontrollers 150, or the like. A processing unit may comprise a processing core, a soft core, a hard core, synthesizable logic, analog and/or mixed signal logic, an execution unit, a module, a sub-component, and/or other part of a microcontroller 150 capable of executing an instruction. In one embodiment, different processing units may have separate logical and/or physical interfaces, (e.g., busses, control lines, addresses and/or address spaces, or the like) in order to independently receive commands and/or instructions. In other embodiments, different processing units may share a logical and/or physical interface, and may dynamically distinguish received commands and/or instructions by category, command type, instruction set, flag, identifier, or the like.

Different processing units and/or cores of a microcontroller 150 may support different instruction sets (e.g., different microcode commands and/or instructions), based on the categories and/or types of tasks assigned to the different processing units and/or cores. An instruction set for a processing unit, as used herein, may comprise one or more commands and/or instructions supported by and/or compatible with the processing unit. In various embodiments, an instruction set may include and/or support one or more microcode instructions, assembly code instructions, machine instructions, memory instructions, device instructions, control and/or management instructions, or the like.

In one embodiment, one or more processing units may perform a flow control category of tasks (e.g., a flow control instruction set). One or more processing units, in certain embodiments, may perform a timing control category of tasks (e.g., a timing control instruction set). One or more processing units, in a further embodiment, may perform a data latch control category of tasks (e.g., a data latch control instruction set). In one embodiment, one or more processing units may perform a voltage control category of tasks (e.g., a voltage control instruction set). One or more processing units, in certain embodiments, may perform a built-in self-test (BIST) category of tasks (e.g., a self-test instruction set). In one embodiment, one or more processing units may perform one or more other types and/or categories of tasks, instruction sets, or the like. Two instruction sets may be different, in certain embodiments, in response to at least one instruction and/or command included in one instruction set not being included in another instruction set. A microcontroller 150, in one embodiment, comprises and/or supports an instruction set comprising a combined sum and/or total of the different instruction sets supported by the processing units associated with and/or available to the microcontroller 150.

Figure 2:
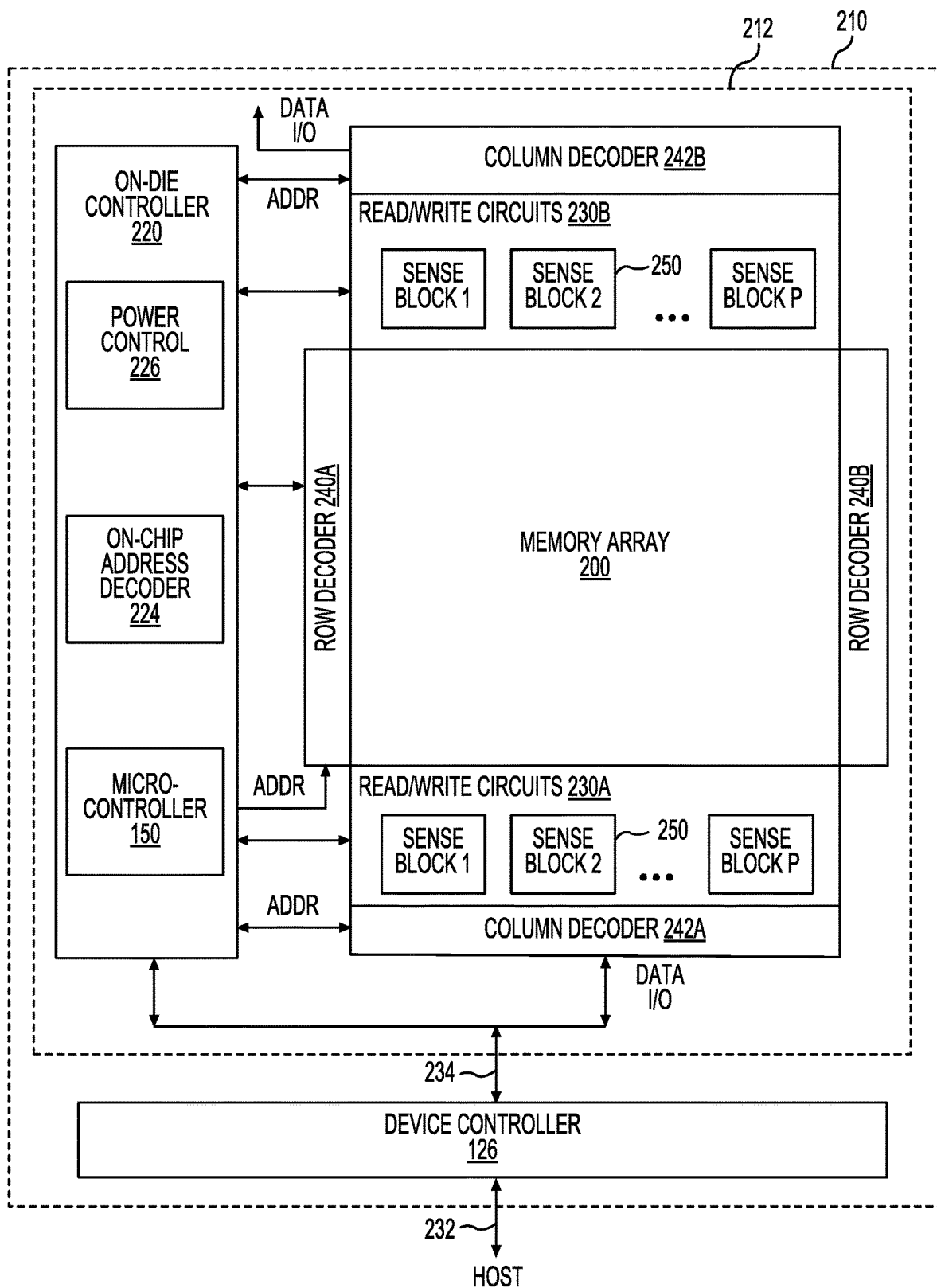
FIG. 2 is a schematic block diagram illustrating another embodiment of a system for an on-die memory microcontroller according to aspects of the disclosure.

In one embodiment, a microcontroller 150 may be disposed at or toward an edge and/or peripheral of a memory element 123, adjacent and/or next to an array of memory media 122 (e.g., as depicted in FIG. 2). In a further embodiment, a microcontroller 150 may be disposed on a different level, layer, and/or plane of an integrated circuit device 123 than an array of memory media 122 (e.g., as CMOS or other circuit under the array, parallel with and offset from the array, or the like). Forming and/or placing a microcontroller 150 on a different level of an integrated circuit device 123 than an array of memory media 122, in certain embodiments, may conserve space of the integrated circuit device 123, allowing more circuits (e.g., more or larger microcontrollers 150 and/or microcontroller cores 150, processing units, a larger array of memory media 122, or the like), a smaller integrated circuit device 123, or the like. In certain embodiments, through-silicon vias (e.g., TSVs) between different levels of an integrated circuit device 123 may provide electrical connections between one or more microcontrollers 150 and an array of memory media 122.

In certain embodiments, an integrated circuit device 123 may comprise one or more additional microcontrollers 150, microcontroller cores 150, or the like. Different microcontrollers 150 and/or microcontroller cores 150 may be on the same level and/or layer as each other (e.g., a different level and/or layer than a memory array, parallel to and offset from a level of the memory array, or the like), may be on multiple different levels and/or layers (e.g., multiple different levels and/or layers than the memory array, parallel to and offset from a level of the memory array and from each other, or the like), may be on one or more same levels and/or layers as a memory array, or the like.

In one embodiment, to conserve space of an integrated circuit device 123, one or more additional microcontrollers 150 and/or microcontroller cores 150 may comprise fewer processing units, may comprise processing units configured to perform fewer types and/or categories of tasks, or the like than a first microcontroller 150 and/or microcontroller core 150 (e.g., a primary, main, control, full, and/or complete microcontroller core 150 with one or more secondary, partial, smaller, and/or reduced microcontroller cores 150 comprising fewer processing units, or the like).

For example, a first microcontroller 150 and/or microcontroller core 150 may comprise and/or be in communication with a built-in self-test processing unit configured to perform self-test operations on an array of memory media 122, while one or more additional microcontrollers 150 and/or microcontroller cores 150 may have no built-in self-test processing unit. In a further embodiment, a first microcontroller 150 and/or microcontroller core 150 is configured to perform both program/write and read operations on a memory array, while one or more additional microcontrollers 150 and/or microcontroller cores 150 may be configured to perform read operations, but not program/write operations on the memory array (e.g., and may have a smaller footprint and/or size than the first microcontroller 150).

In certain embodiments, a first set of one or more microcontrollers 150 (e.g., primary, main, control, full, and/or complete microcontroller cores 150, or the like) may perform program/write operations for an entire array of memory media 122 (e.g., each channel, subset, and/or region of memory cells of an integrated circuit device 123) while both the first set of one or more microcontrollers 150 and a second set of one or more microcontrollers 150 (e.g., one or more secondary, partial, smaller, and/or reduced microcontroller cores 150 comprising fewer processing units, or the like) may perform read operations for different parts of the array of memory media 122 (e.g., being assigned to different channels, subsets, and/or regions of memory cells of an integrated circuit device 123).

The memory device 120, in various embodiments, may be disposed in one or more different locations relative to the computing device 110. In one embodiment, the memory device 120 comprises one or more non-volatile and/or volatile memory elements 123, such as semiconductor chips or packages or other integrated circuit devices disposed on one or more printed circuit boards, storage housings, and/or other mechanical and/or electrical support structures. For example, the memory device 120 may comprise one or more direct inline memory module (DIMM) cards, one or more expansion cards and/or daughter cards, a memory card, a universal serial bus (USB) drive, a solid-state-drive (SSD) or other hard drive device, and/or may have another memory and/or storage form factor. The memory device 120 may be integrated with and/or mounted on a motherboard of a computing device 110, installed in a port and/or slot of the computing device 110, installed on a different computing device 110 and/or a dedicated storage appliance on the network 115, in communication with the computing device 110 over an external bus (e.g., an external hard drive), or the like.

The memory device 120, in one embodiment, may be disposed on a memory bus of a processor 111 (e.g., on the same memory bus as the volatile memory 112, on a different memory bus from the volatile memory 112, in place of the volatile memory 112, or the like). In a further embodiment, the memory device 120 may be disposed on a peripheral bus of the computing device 110, such as a peripheral component interconnect express (PCI Express or PCIe) bus, a serial Advanced Technology Attachment (SATA) bus, a parallel Advanced Technology Attachment (PATA) bus, a small computer system interface (SCSI) bus, a FireWire bus, a Fibre Channel connection, a Universal Serial Bus (USB), a PCIe Advanced Switching (PCIe-AS) bus, or the like. In another embodiment, the memory device 120 may be disposed on a data network 115, such as an Ethernet network, an Infiniband network, SCSI RDMA over a network 115, a storage area network (SAN), a local area network (LAN), a wide area network (WAN) such as the Internet, another wired and/or wireless network 115, or the like.

The computing device 110 may further comprise a non-transitory, computer readable storage medium 114. The computer readable storage medium 114 may comprise executable instructions configured to cause the computing device 110 (e.g., processor 111) to perform steps of one or more of the methods disclosed herein. Alternatively, or in addition, the microcontroller 150 may include one or more computer readable instructions stored on the non-transitory storage medium 114.

In one embodiment, a microcontroller 150 may comprise logic hardware of a non-volatile and/or volatile memory element 123, other programmable logic, firmware for a non-volatile and/or volatile memory element 123, microcode for execution by a non-volatile and/or volatile memory element 123, or the like. In another embodiment, a microcontroller 150 may at least partially comprise executable software code (e.g., microcode), stored on a computer readable storage medium for execution by logic hardware of a non-volatile and/or volatile memory element 123 (e.g., for execution by the microcontroller 150 itself, by the processor 111, or the like). In a further embodiment, a microcontroller 150 may include a combination of both executable software code and logic hardware.

In one embodiment, the microcontroller 150 is configured to receive requests and/or commands from a device driver or other executable application via buses 125, 127, a memory media controller 126, or the like. The microcontroller 150 may be further configured to transfer data to/from a device driver and/or storage clients 116 via the bus 125. Accordingly, the microcontroller 150, in some embodiments, may comprise and/or be in communication with one or more direct memory access (DMA) modules, remote DMA modules, bus controllers, bridges, buffers, and so on to facilitate the transfer of storage requests and associated data. In another embodiment, the microcontroller 150 may receive storage requests and/or refresh commands as an API call from a storage client 116, as an IO-CTL command, or the like.

In one embodiment, a microcontroller 150 is integrated on a memory element 123 (e.g., an on-die controller and/or other logic hardware or executable code) and receives commands from a device controller 126, a host device 110, and/or a processor 111. In other embodiments, a portion of a microcontroller 150 may be disposed on a device controller 126 or other interposer and a portion of a microcontroller 150 may be disposed on a memory element 123, or the like.

According to various embodiments, a memory controller 126 and/or a microcontroller 150 may manage one or more memory devices 120 and/or memory elements 123. The memory device(s) 120 may comprise recording, memory, and/or storage devices, such as solid-state storage device(s) and/or semiconductor storage device(s) that are arranged and/or partitioned into a plurality of addressable media storage locations. As used herein, a media storage location refers to any physical unit of memory (e.g., any quantity of physical storage media on a memory device 120). Memory units and/or regions may include, but are not limited to: pages, memory divisions, blocks, sectors, collections or sets of physical storage locations (e.g., logical pages, logical blocks), or the like.

A device driver, the memory media controller 126, and/or a microcontroller 150, in certain embodiments, may present a logical address space 134 to the storage clients 116. As used herein, a logical address space 134 refers to a logical representation of memory resources. The logical address space 134 may comprise a plurality (e.g., range) of logical addresses. As used herein, a logical address refers to any identifier for referencing a memory resource (e.g., data), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like.

A device driver for the memory device 120 may maintain metadata 135, such as a logical to physical address mapping structure, to map logical addresses of the logical address space 134 to media storage locations on the memory device(s) 120. A device driver may be configured to provide storage services to one or more storage clients 116. The storage clients 116 may include local storage clients 116 operating on the computing device 110 and/or remote, storage clients 116 accessible via the network 115 and/or network interface 113. The storage clients 116 may include, but are not limited to: operating systems, file systems, database applications, server applications, kernel-level processes, user-level processes, applications, and the like.

A device driver may be communicatively coupled to one or more memory devices 120. The one or more memory devices 120 may include different types of memory devices including, but not limited to: solid-state storage devices, semiconductor storage devices, SAN storage resources, volatile memory devices, non-volatile memory devices, or the like. The one or more memory devices 120 may comprise one or more respective memory media controllers 126 and memory media 122. A device driver may provide access to the one or more memory devices 120 via a traditional block I/O interface 131. Additionally, a device driver may provide access to enhanced functionality through the SCM interface 132. The metadata 135 may be used to manage and/or track data operations performed through any of the Block I/O interface 131, SCM interface 132, cache interface 133, or other, related interfaces.

The cache interface 133 may expose cache-specific features accessible via a device driver for the memory device 120. Also, in some embodiments, the SCM interface 132 presented to the storage clients 116 provides access to data transformations implemented by the one or more memory devices 120 and/or the one or more memory media controllers 126.

A device driver may present a logical address space 134 to the storage clients 116 through one or more interfaces. As discussed above, the logical address space 134 may comprise a plurality of logical addresses, each corresponding to respective media locations the on one or more memory devices 120. A device driver may maintain metadata 135 comprising any-to-any mappings between logical addresses and media locations, or the like.

A device driver may further comprise and/or be in communication with a memory device interface 139 configured to transfer data, commands, and/or queries to the one or more memory devices 120 over a bus 125, which may include, but is not limited to: a memory bus of a processor 111, a peripheral component interconnect express (PCI Express or PCIe) bus, a serial Advanced Technology Attachment (ATA) bus, a parallel ATA bus, a small computer system interface (SCSI), FireWire, Fibre Channel, a Universal Serial Bus (USB), a PCIe Advanced Switching (PCIe-AS) bus, a network 115, Infiniband, SCSI RDMA, or the like. The memory device interface 139 may communicate with the one or more memory devices 120 using input-output control (IO-CTL) command(s), IO-CTL command extension(s), remote direct memory access, or the like.

The communication interface 113 may comprise one or more network interfaces configured to communicatively couple the computing device 110 and/or the memory controller 126 to a network 115 and/or to one or more remote, network-accessible storage clients 116. The storage clients 116 may include local storage clients 116 operating on the computing device 110 and/or remote, storage clients 116 accessible via the network 115 and/or the network interface 113. The memory controller 126 is part of and/or in communication with one or more memory devices 120. Although FIG. 1 depicts a single memory device 120, the disclosure is not limited in this regard and could be adapted to incorporate any number of memory devices 120, a combination of one or more volatile memory devices 120 and one or more non-volatile memory devices 120, or the like.

The memory device 120 may comprise one or more elements 123 of memory media 122. In one embodiment, an element 123 of memory media 122 comprises a volatile memory medium 122, such as random access memory (RAM), dynamic RAM (DRAM), synchronous DRAM (SDRAM), double data rate (DDR) SDRAM, static RAM (SRAM), thyristor RAM (T-RAM), zero-capacitor RAM (Z-RAM), or the like. In certain embodiments, an element 123 of memory media 122 comprises a non-volatile memory medium 122, such as ReRAM, Memristor memory, programmable metallization cell memory, phase-change memory (PCM, PCME, PRAM, PCRAM, ovonic unified memory, chalcogenide RAM, or C-RAM), NAND flash memory (e.g., 2D NAND flash memory, 3D NAND flash memory), NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS) memory, programmable metallization cell (PMC) memory, conductive-bridging RAM (CBRAM), magneto-resistive RAM (MRAM), magnetic storage media (e.g., hard disk, tape), optical storage media, or the like. The one or more elements 123 of memory media 122, in certain embodiments, comprise storage class memory (SCM).

While legacy technologies such as NAND flash may be block and/or page addressable, storage class memory, in one embodiment, is byte addressable. In further embodiments, storage class memory may be faster and/or have a longer life (e.g., endurance) than NAND flash; may have a lower cost, use less power, and/or have a higher storage density than DRAM; or offer one or more other benefits or improvements when compared to other technologies. For example, storage class memory may comprise one or more non-volatile memory elements 123 of ReRAM, Memristor memory, programmable metallization cell memory, phase-change memory, nano RAM, nanocrystal wire-based memory, silicon-oxide based sub-10 nanometer process memory, graphene memory, SONOS memory, PMC memory, CBRAM, MRAM, and/or variations thereof.

While the non-volatile memory media 122 is referred to herein as "memory media," in various embodiments, the non-volatile memory media 122 may more generally comprise one or more non-volatile recording media capable of recording data, which may be referred to as a non-volatile memory medium, a non-volatile storage medium, or the like. Further, the non-volatile memory device 120, in various embodiments, may comprise a non-volatile recording device, a non-volatile memory device, a non-volatile storage device, or the like. Similarly, a non-volatile memory element 123, in various embodiments, may comprise a non-volatile recording element, a non-volatile memory element, a non-volatile storage element, or the like.

The non-volatile memory media 122 may comprise one or more non-volatile memory elements 123, which may include, but are not limited to: chips, packages, planes, die, or the like. A non-volatile memory media controller 126 may be configured to manage data operations on the non-volatile memory media 122, and may comprise one or more processors, programmable processors (e.g., FPGAs), ASICs, micro-controllers, or the like. In some embodiments, the non-volatile memory media controller 126 is configured to store data on and/or read data from the non-volatile memory media 122, to transfer data to/from the non-volatile memory device 120, and so on.

The non-volatile memory media controller 126 may be communicatively coupled to the non-volatile memory media 122 (e.g., to the microcontroller 150) by way of a bus 127. The bus 127 may comprise an I/O bus for communicating data to/from the non-volatile memory elements 123 and/or the associated microcontrollers 150. The bus 127 may further comprise a control bus for communicating addressing and other command and control information to the non-volatile memory elements 123 and/or the microcontrollers 150. In some embodiments, the bus 127 may communicatively couple the non-volatile memory elements 123 (e.g., the microcontrollers 150) to the non-volatile memory media controller 126 in parallel. This parallel access may allow the non-volatile memory elements 123 to be managed as a group, forming a logical memory element 129. The logical memory element may be partitioned into respective logical memory units (e.g., logical pages) and/or logical memory divisions (e.g., logical blocks). The logical memory units may be formed by logically combining physical memory units of each of the non-volatile memory elements.

The non-volatile memory controller 126 and/or a microcontroller 150 may comprise and/or be in communication with a device driver executing on the computing device 110. A device driver may provide storage services to the storage clients 116 via one or more interfaces 131, 132, and/or 133. In some embodiments, a device driver provides a block-device I/O interface 131 through which storage clients 116 perform block-level I/O operations. Alternatively, or in addition, a device driver may provide a storage class memory (SCM) interface 132, which may provide other storage services to the storage clients 116. In some embodiments, the SCM interface 132 may comprise extensions to the block device interface 131 (e.g., storage clients 116 may access the SCM interface 132 through extensions or additions to the block device interface 131). Alternatively, or in addition, the SCM interface 132 may be provided as a separate API, service, and/or library. A device driver may be further configured to provide a cache interface 133 for caching data using the non-volatile memory system 102. A device driver may further comprise a non-volatile memory device interface 139 that is configured to transfer data, commands, and/or queries to the non-volatile memory media controller 126 and/or a microcontroller 150 over a bus 125, as described above.

Figure 5:
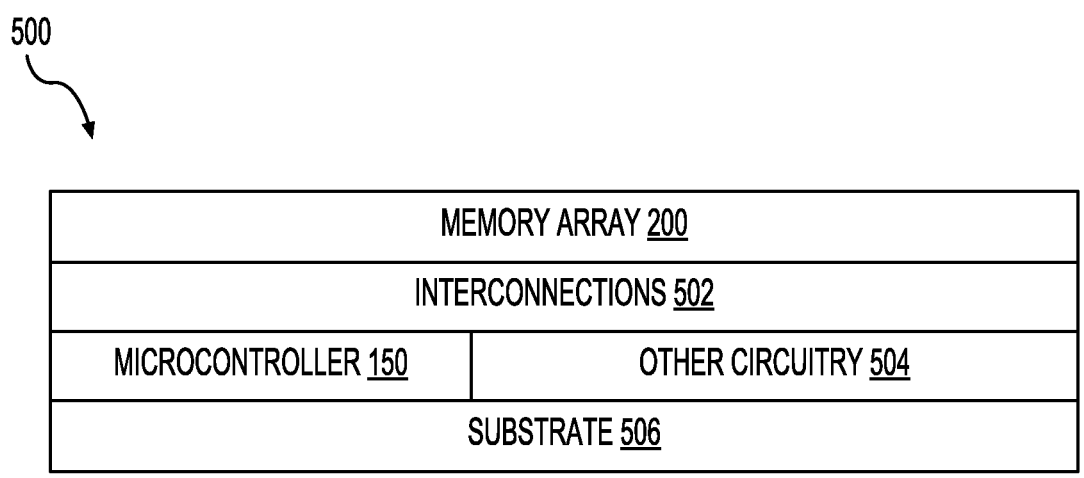
FIG. 5 is a schematic block diagram illustrating one embodiment of an integrated circuit device with an on-die memory microcontroller according to aspects of the disclosure.

FIG. 2 illustrates an embodiment of a non-volatile storage device 210 that may include one or more memory die or chips 212, with one or more microcontrollers 150. The nonvolatile storage device 210 may be substantially similar to the nonvolatile memory device 120 described with reference to FIG. 1. While the one or more microcontrollers 150 of FIG. 2 are depicted toward a periphery of the memory die and/or chip 212 (e.g., on a same physical level as the memory array 200 in an integrated circuit device 123), in other embodiments, one or more microcontrollers 150 may be disposed on a different physical level of the memory die and/or chip 212 than the memory array 200 (e.g., parallel to and offset from a level of the memory array 200 in an integrated circuit device 123), as depicted in FIG. 5.

The memory die 212, in some embodiments, includes an array 200 (e.g., two-dimensional or three dimensional) of memory cells, an on-die controller 220, and read/write circuits 230A/230B. In one embodiment, access to the memory array 200 by the various peripheral circuits is implemented in a symmetric fashion, on opposite sides of the array, so that the densities of access lines and circuitry on each side are reduced by half. The read/write circuits 230A/230B, in a further embodiment, include multiple sense blocks 250 which allow a page of memory cells to be read or programmed in parallel. In certain embodiments, the sense blocks 250 are in communication with the one or more microcontrollers 150.

The memory array 200, in various embodiments, is addressable by word lines via row decoders 240A/240B and by bit lines via column decoders 242A/242B. In some embodiments, a controller 244 is included in the same memory device 210 (e.g., a removable storage card or package) as the one or more memory die 212. Commands and data are transferred between the host and controller 244 via lines 232 and between the controller and the one or more memory die 212 via lines 234. One implementation can include multiple chips 212.

On-die controller 220, in one embodiment, cooperates with the read/write circuits 230A/230B to perform memory operations on the memory array 200. The on-die controller 220, in certain embodiments, includes a microcontroller 150, an on-chip address decoder 224, and a power control circuit 226. In one embodiment, the on-chip address decoder 224 and/or the power control circuit 226 may be part of and/or controlled by the micro-controller 150.

The microcontroller 150, in one embodiment, provides chip-level control of memory operations. The on-chip address decoder 224 provides an address interface to convert between the address that is used by the host or a memory controller to the hardware address used by the decoders 240A, 240B, 242A, 242B. The power control circuit 226 controls the power and voltages supplied to the word lines and bit lines during memory operations. In one embodiment, power control circuit 226 includes one or more charge pumps that can create voltages larger than the supply voltage.

In one embodiment, one or any combination of on-die controller 220, microcontroller 150, power control circuit 226, decoder circuit 224, decoder circuit 242A, decoder circuit 242B, decoder circuit 240A, decoder circuit 240B, read/write circuits 230A, read/write circuits 230B, and/or controller 244 can be referred to as one or more managing circuits.

Figure 3:
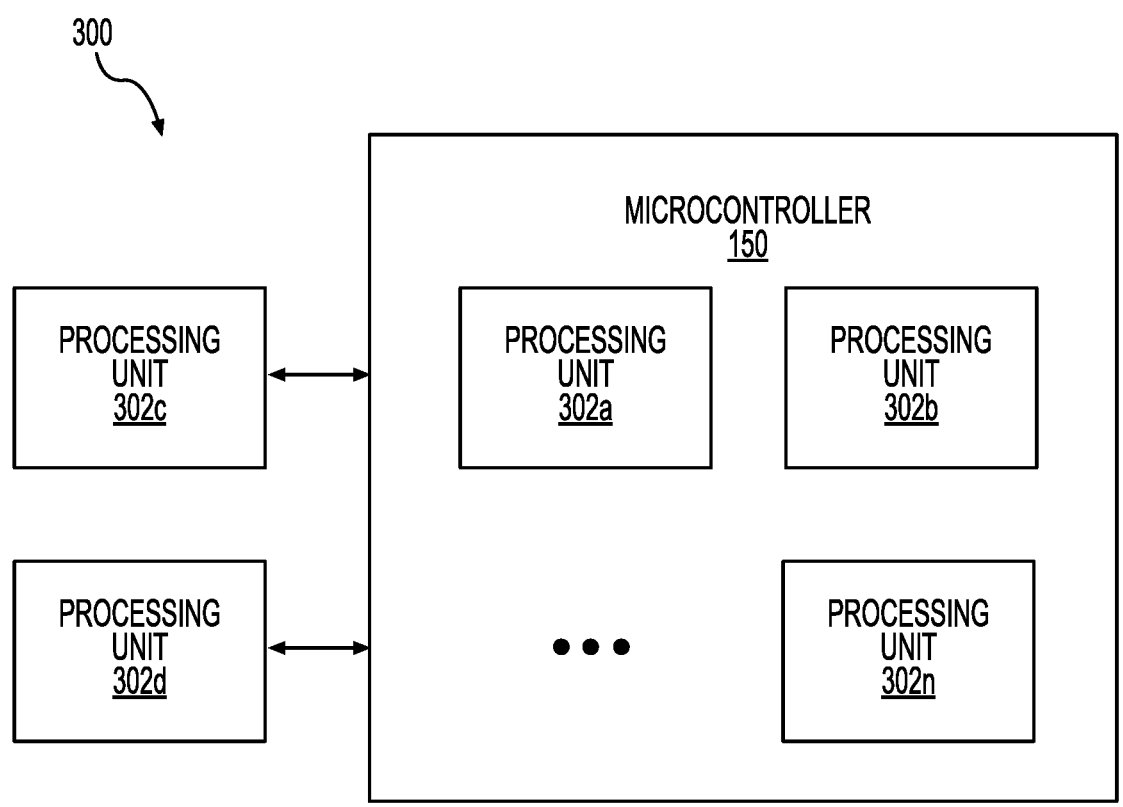
FIG. 3 is a schematic block diagram illustrating one embodiment of an on-die memory microcontroller according to aspects of the disclosure.

FIG. 3 depicts one embodiment of a system 300 with an on-die memory microcontroller unit 150. The microcontroller 150 of FIG. 3, in certain embodiments, may be substantially similar to the microcontroller 150 of FIG. 1 and/or the microcontroller 150 of FIG. 2.

In the depicted embodiment, the microcontroller 150 comprises and/or is in communication with a plurality of processing units 302a-n. Some processing units 302a, 302b, 302n are internal to and/or part of the microcontroller 150, while other processing units 302c, 302d are external to the microcontroller 150 (e.g., external processing units, functional units, or the like) and are in communication with the microcontroller 150 (e.g., and may be in communication with one or more additional microcontrollers 150 and/or microcontroller cores 150). In certain embodiments, the processing units 302c, 302d, external to the microcontroller 150 may be disposed in the same level (e.g., one or more layers, planes, or the like) as the microcontroller 150 within an integrated circuit device 123 (e.g., under a memory array 200, or the like).

The processing units 302a-n, in various embodiments, may comprise one or more of a read processing unit 302, a program/write processing unit 302, a built-in self-test processing unit 302, a flow control processing unit 302, a timing control processing unit 302, a voltage control processing unit 302, and/or a data latch control processing unit 302, or the like. The processing units 302a-n may perform different categories of tasks, such as flow control tasks, timing control tasks, data latch control tasks, voltage control tasks, and/or built-in self-test tasks, or the like.

In certain embodiments, using a microcontroller 150 (e.g., instead of and/or in addition to a finite state machine, or the like), may allow dynamic updates and/or changes to timing, voltages, logic operations, instructions, commands, microcode, or the like for the microcontroller 150, even after hardware of the microcontroller 150 and/or associated integrated circuit device 123 has been finalized and/or manufactured, in the field, or the like, without changing the hardware. The multiple processing units 302a-n, in one embodiment, operating in parallel (e.g., multithreaded), may allow the microcontroller 150 to operate at a lower clock speed than would otherwise be possible without also increasing a latency of memory operations (e.g., read, program/write, erase) on the memory array 200.

Each processing unit 302, in certain embodiments, comprises a read port which the processing unit 302 may use to access instructions/commands and/or data from a volatile memory module (e.g., the volatile memory modules 406 described below with regard to FIG. 4, or the like). Communications between processing units 302a-n may occur over a standard interface (e.g., the same protocol for different types of processing units 302a-n) that transfers both commands and data. In one embodiment, the same interface may be used for processing units 302a, 302b, 302n within a microcontroller 150 and for processing units 302c, 302d outside of the microcontroller 150.

Figure 4:
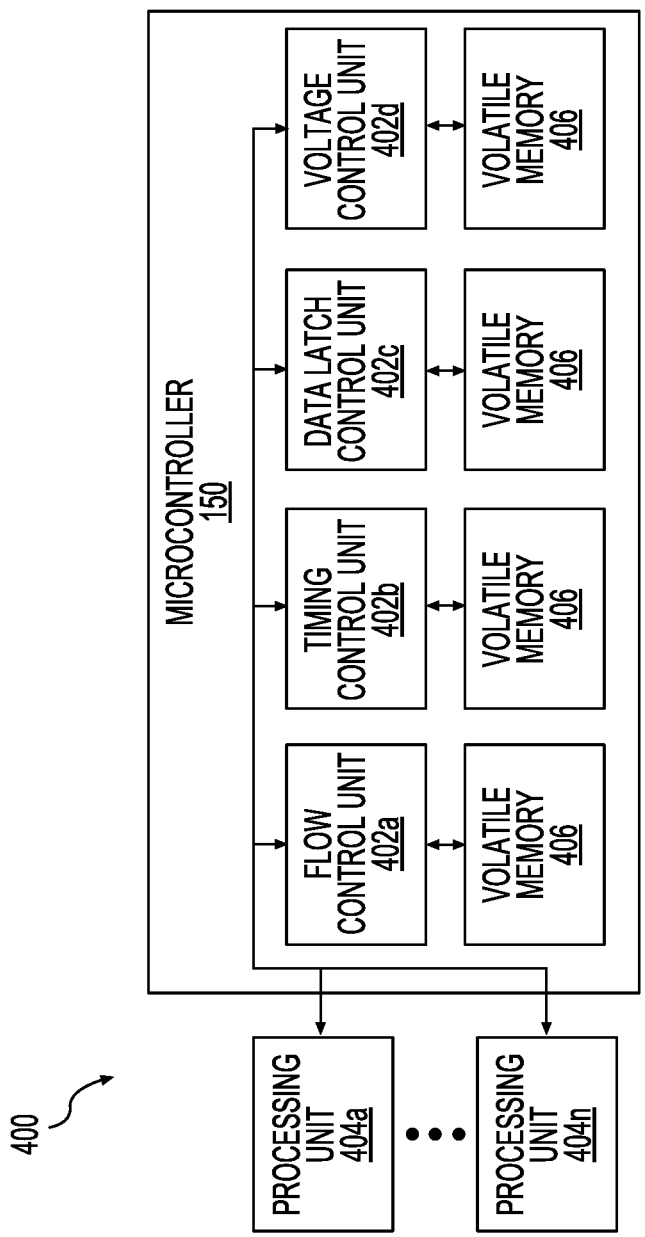
FIG. 4 is a schematic block diagram illustrating a further embodiment of an on-die memory microcontroller according to aspects of the disclosure.

FIG. 4 depicts one embodiment of a system 400 with an on-die memory microcontroller 150. The microcontroller 150, in certain embodiments, may be substantially similar to one or more of the microcontroller 150 of FIG. 1, the microcontroller 150 of FIG. 2, and/or the microcontroller 150 of FIG. 3, described above. In the depicted embodiment, the microcontroller 150 comprises a flow control processing unit 402a, a timing control processing unit 402b, a data latch control processing unit 402c, and a voltage control processing unit 402d, each in communication with volatile memory 406 and with one or more external processing units 404a-n, external to the microcontroller 150.

The flow control processing unit 402a, in certain embodiments, may control and/or track execution of one or more memory operations (e.g., read operations, write/program operations, erase operations, management operations such as garbage collection operations, or the like) for a memory array 200. For example, a flow control processing unit 402a may direct a series of states for different memory operations, managing one or more other processing units 402 (e.g., a timing control unit 402b, a data latch control unit 402c, a voltage control unit 402d, one or more external processing units 404a-n, or the like) to execute the different memory operations, sending them commands/instructions, determining a state of the other processing units 402, 404 during the different memory operations, or the like. A flow control processing unit 402a, in one embodiment, may manage a data path for memory operations (e.g., between a device controller 126 and a memory array 200, between a microcontroller 150 and a memory array 200, or the like). A flow control processing unit 402a, in some embodiments, may manage one or more internal data busses of a microcontroller 150, of an integrated circuit device 123 comprising the microcontroller 150, or the like.

The flow control processing unit 402a, in one embodiment, may comprise or otherwise include a read processing unit configured to execute and/or manage (e.g., in parallel with one or more other processing units 402a-n, 404a-n) a subroutine of microcode, assembly code, and/or other computer executable code to read data from a memory array 200 and provide the read data to a device controller 126, a host device 110, a storage client 116, or the like (e.g., in response to a read request from the device controller 126, the host device 110, the storage client 116, or the like).

A flow control processing unit 402a, in one embodiment, may comprise or otherwise include a write/program processing unit configured to execute and/or manage (e.g., in parallel with one or more other processing units 402a-n, 404a-n) a subroutine of microcode, assembly code, and/or other computer executable code to write/program data to a memory array 200, in response to a write request from a device controller 126, a host device 110, a storage client 116, or the like). In certain embodiments, a first microcontroller 150a may comprise a flow control processing unit 402a with a write/program processing unit and a read processing unit, while one or more other microcontrollers 150b-n comprise a read processing unit without a write/program processing unit (e.g., to conserve power, circuit size/space, or the like).

In one embodiment, a flow control processing unit 402a acts as the command center of one or more other processing units 402b-d, 404a-n. A flow control processing unit 402a may send commands and/or data to other processing units 402b-d, 404a-n and monitor their status. This one-to-all communication pattern, in certain embodiments, may reduce microcode and design complexity. In one embodiment, to minimize an instruction memory space 406 used by the flow control processing unit 402 a and/or to prevent the flow control processing unit 402a from becoming a performance bottleneck, the flow control processing unit 402a may control and track some tasks, but may invoke other tasks for one or more processing units 402b-d, 404a-n without monitoring and/or tracking an ongoing status.

To facilitate and/or simplify control by a flow control processing unit 402a, in certain embodiments, one or more other processing units 402b-d, 404a-n may have a substantially similar interface (e.g., a standard interface or the like). One or more different processing units 402a-d, 404a-n may have a standard interface, but may support a different instruction set for executing different categories and/or types of tasks.

While many tasks, (e.g., having complex algorithms and/or repetitive execution) may be controlled by processing units 402b-d, 404a-n through the flow control processing unit 402a's standard interface protocol, there may be other small and/or one-time-execution tasks for certain types of operations. In embodiments where there are many such small tasks, the flow control processing unit 402a may comprise an expanded and/or customizable interface to provide support for the tasks, for new tasks over time, for custom tasks, or the like.

For example, the flow control processing unit 402a may support one or more command tables in a control register array (e.g., 64 bits by 16 bits, or the like) of the microcontroller 150. A control register array, in certain embodiments, may be accessed by the flow control processing unit 402a's load (LOD) and/or store (STR) instructions. At least a portion of the control register array's space may be virtual, because the flow control processing unit 402a's design may only occupy a subset of the space (e.g., 5 of the 64 registers, or the like). The rest of the control register array may be relatively independent from the flow control processing unit 402a, for use by custom tasks, or the like. One or more registers in the control register array not reserved for the flow control processing unit 402a, in certain embodiments, may be store custom command tables to expand the microcontroller's functionality for executing small tasks, one-time tasks, new tasks over time, or the like.

In some embodiments, a one-to-all communication pattern may use back-and-forth signal/command pairs between the flow control processing unit 402a and the timing control processing unit 402b. which may control the pace of the microcontroller 150. An output of the timing control processing unit 402b may be delivered to one or more peripheral modules of the memory array 200 throughout a memory access operation, to control the timing of the memory access operation. If the flow control processing unit 402 a remains the sole master module in the microcontroller 150, it may monitor the timing control processing unit 402b's progress for each step of a memory access operation on a memory array 200, using processing time and/or volatile memory 406 overhead to synchronize the flow control processing unit 402a and the timing control unit 402b, as the flow control processing unit 402 a sends commands to the timing control unit 402b and receives feedback signals from the timing control processing unit 402b (e.g., through the flow control processing unit 402a's interrupt interface, or the like).

To improve parallelism of a microcontroller 150's processing units 402a-d, 404a-n and/or pipelines, to reduce a number of lines of microcode, save instruction/data memory space 406, or the like, one or more of the processing units 402a-d, 404a-n may comprise one or more buffer and/or output stages. While the flow control processing unit 402a may still be a master for the microcontroller 150, when enabled by the flow control processing unit 402a, the timing control processing unit 402b may become a proxy for the flow control processing unit 402a that triggers other processing units 402c-d, 404a-n in a timely manner for one or more memory operations on a memory array 200.

The voltage control processing unit 402d may convert binary and/or digital values from the microcontroller 150 to analog voltages for the memory array 200 (e.g., program voltages, erase voltages, read voltages, bias voltages, word line voltages, bit line voltages, inhibit voltages, or the like). The data latch control processing unit 402c, in certain embodiments, may control one or more data buffers for the memory array, logic circuits for the memory array 200 (e.g., YLOG logic circuits that control the sense amplifiers 250, read/write circuits 230, row decoders 240, or the like), and/or other circuits for a memory array 200 of an integrated circuit device 123.

In one embodiment, the data latch control processing unit 402c may decode data from a volatile memory 406 into a command index (e.g., decoding 32-bit and/or 64-bit SRAM data into one or more command indexes, or the like). The data latch control processing unit 402 c, in certain embodiments, may translate decoded command indexes into one or more commands (e.g., YLOG commands) using hardcoded combination logic and/or other rules. The data latch control processing unit 402c may buffer a predetermined number of commands each clock cycle or set of clock cycles. For example, the data latch control processing unit 402c may buffer four commands every clock cycle and output one of the four logic commands every quarter of a clock cycle (e.g., every 20 nanoseconds for an 80 nanosecond clock cycle, or the like). The data latch control processing unit 402c may store predefined command sequences (e.g., YLOG command sequences), in volatile memory 406 or the like.

The microcontroller 150 may provide flexible control of values stored in data latches, with the data latch control processing unit 402c storing data in data latches based on command indexes decoded to command sequences, and the flow control processing unit 402a selectively overriding data stored in one or more data latches. For example, the flow control processing unit 402a may initiate the data latch control processing unit 402c to execute a subroutine (e.g., microcode or other computer executable program code) to produce a command sequence (e.g., one or more commands for the memory array 200 and/or for sense amplifiers 250, read/write circuits 230, row decoders 240, or the like), the flow control processing unit 402a may store one or more data values to one or more data latches directly; the flow control processing unit 402a may mask, truncate, change, update, and/or overwrite a command index for the data latch.

FIG. 5 is a schematic block diagram illustrating one embodiment of an integrated circuit device 500 with an on-die memory microcontroller 150. In the depicted embodiment, a memory array 200 (e.g., one or more die planes, or the like) is in one level of the integrated circuit device 500 (e.g., one or more layers of conductors, insulators, semiconductors, or the like) and the microcontroller 150 and other circuitry 504 (e.g., sense amplifiers, word line switches, or the like) are in a different level of the integrated circuit device 500 (e.g., under the array 200), and are in communication with the memory array 200 through one or more interconnections 502 (e.g., insulating layers, conductive layers, through silicon vias, holes, buses, or the like). In the depicted embodiment, the memory array 200 is in a first level of the integrated circuit device 500, and the microcontroller 150 is in a second level of the integrated circuit device 500 that is parallel to and offset from the first level. A substrate 506 comprises a third level of the integrated circuit device 500 (e.g., a support structure on which one or more other layers are formed and/or deposited), and is parallel to and offset from the other layers.

Figure 6:
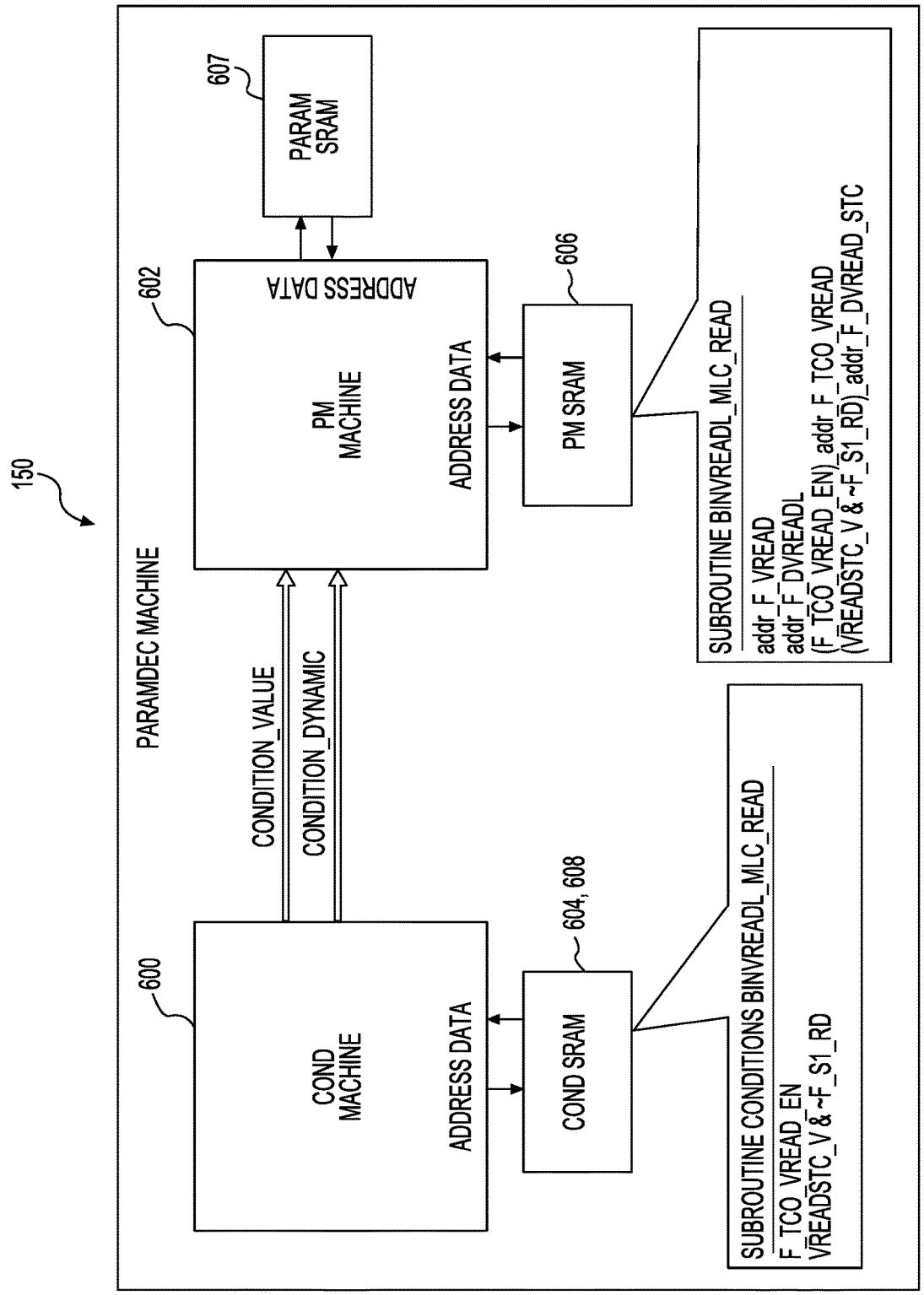
FIG. 6 shows a condition machine and a parameter management machine in a firmware executed by a microcontroller according to aspects of the disclosure.

Continuing to refer to FIG. 5, as discussed above, the integrated circuit device or apparatus 500 includes a plurality of non-volatile memory cells (e.g., of memory array 200) and a microcontroller 150 that is in communication with the plurality of non-volatile memory cells. The software or firmware executed by the controller (e.g., microcontroller 150) can include multiple modules or machines executed in parallel (e.g., using multiple processing units 302a-n operating in parallel). Alternatively, a separate controller can be present inside every module or machine which decodes and executes these instructions to perform an operation. As shown in FIG. 6, two of the modules can include a condition (COND) machine 600 and a parameter management (PM) machine 602. So, the microcontroller 150 can use various RAM for storing the firmware. All firmware code is written in the form of instructions and these instructions are fetched from the RAM as and when required.

As discussed above, each of the plurality of non-volatile memory cells can be in communication with one of a plurality of word lines and the microcontroller 150 is coupled with a power control circuit 226 configured to provide a plurality of word line voltages to each of the plurality of word lines for a memory operation command. Thus, the output value from the microcontroller 150 executing the code for the condition machine 600 and the parameter management machine 602 (e.g., as part of the voltage control processing unit 402d described above) can, for example, be a digital value (output or BIN value) provided to the power control circuit 226 corresponding to one of the plurality of word line voltages. So, the condition machine 600 and parameter management machine 602 compute the BIN values or output values that needs to be provided to charge pumps for generating the required voltage. These voltages will be applied to word lines during memory operations.

More specifically, the parameter management machine 602 will add offsets to get output values (e.g., for temperature compensation). The addition of some offsets depends on conditions. These conditions are evaluated in the condition machine 600. The value of conditions are then passed from condition machine 600 to parameter management machine 602. While the parameter management machine 602 and condition machine 600 are discussed for the purpose of calculating the output values to provide to the power control circuit 226, it should be understood that such modules or machines may instead be used for other purposes involving evaluation dynamic conditions, for example.

In the firmware-based architecture, different subroutines are executed to calculate different output values. An example subroutine for calculation of a specific output value is given as part of a subroutine BINVREADL_MLC_READ:
1. add r_F_VREAD
2. addr_F_DVREADL
3. (F_TCO_VREAD_EN)_addr_F_TCO_VREAD
4. (VREADSTC_V & ~F_S1_RD)_addr_F_DVREAD_STC This subroutine is executed as soon as the memory system or apparatus 500 receives the READ command (e.g., from a user). This subroutine is used to calculate the output value that needs to be given to VREADL voltage generator. In this subroutine, different parameters are added to get the value of BINVREADL_MLC_READ. The parameters, F_VREAD and F_DVEARDL are added without any conditions (line #1 and #2 above). The parameter F_TCO_VREAD is added if the condition F_TCO_VREAD_EN is high (line #3). The value of F_TCO_VREAD_EN will be set before the start of READ command. So the decision to add the parameter F_TCO_VREAD can be made during the execution of the subroutine. According to fourth line above, the addition of parameter F_DVREAD_STC depends on the value of signal VREADSTC_V. The value of signal, VREADSTC_V can change after the execution of the subroutine. So, it is necessary to re-evaluate the value of BINVREADL_MLC_READ. This is known as dynamic re-evaluation.

As shown, the microcontroller 150 is configured to receive the memory operation command and monitor a plurality of conditions associated with the memory operation command. In response to receiving the memory operation command, the microcontroller 150 is configured to determine a condition value of one of a plurality of conditions and whether the one of the plurality of conditions is dynamic (e.g., using the condition machine 600). In parallel, the microcontroller 150 is configured to determine and output an output value using the condition value. In other words, the microcontroller 150 determines and outputs an output value using the condition value (e.g., using the parameter management machine 602) during the determining of the condition value of one of the plurality of conditions and whether the one of the plurality of conditions is dynamic. The microcontroller 150 is then configured to determine whether the one the plurality of conditions has changed. In response to determining the one of the plurality of conditions is dynamic and has changed, the microcontroller 150 is configured to determine an updated condition value of one of the plurality of conditions identified as dynamic (e.g., using the condition machine 600). In parallel, the microcontroller 150 is configured to compare the condition value and the updated condition value and determine and output an updated output value using the updated condition value and the comparison of the condition value and the updated condition value. So, during the determining of the updated condition value of the one of the plurality of conditions identified as dynamic, the microcontroller 150 is configured to compare the condition value and the updated condition value and determine and output an updated output value using the updated condition value and the comparison of the condition value and the updated condition value (e.g., using the parameter management machine 602).

There are two type of conditions evaluated in the condition machine 600, static and dynamic. The static conditions are stable throughout the operation. Hence, they need to be evaluated only once. The parameter or condition valuecorresponding to static conditions can be added to get the output value, once the memory operation command is received (e.g., from the user). The dynamic conditions can change the value anytime during the operation. Hence they need to be re-evaluated, when there is a change in the corresponding signal or condition. Also the output value needs to be updated.

So dynamic re-evaluation has two parts: 1) The condition value (e.g., VREADSTC_V & ~F_S1_RD) needs to be reevaluated, and 2) If there is a change in condition value, then the output value (e.g., BINVREADL_MLC_READ) should be re-calculated. Thus, the determining the condition value of one of the plurality of conditions associated with the memory operation command and whether the one of the plurality of conditions is dynamic by the microcontroller 150 (e.g., as part of the condition machine 600) can include additional steps shown in FIG. 7. Specifically, the microcontroller 150 is configured to set a dynamic counter to zero in response to receiving the memory operation command. The microcontroller 150 also reads one of a plurality of condition instructions associated with one of the plurality of conditions from a condition evaluation memory 604 (FIG. 6) and determines whether the one of the plurality of condition instructions is a condition end operation. The microcontroller 150 is also configured to end condition evaluation in response to determining that the one of the plurality of condition instructions is a condition end operation.

The first bit in the first instruction of firmware can be used to differentiate dynamic re-evaluation conditions from static conditions. For dynamic conditions, the first bit in the first instruction of condition firmware will be 1, as shown in the example below:

```
//subroutine (VREADSTC_V & ~ F_S1_RD )
1_11100000001101001110
0_00110000000000000001
0_11100000111110100111
0_00100010000101000000
0_10100110100000000001
```

Thus, the microcontroller 150 determines whether the first bit of the one of the plurality of condition instructions is a one in response to determining that the plurality of condition instructions is not an end operation (e.g., using the condition machine 600). The microcontroller 150 is also configured to store a starting address and a number of lines to execute and a condition identifier associated with the one of the plurality of condition instructions in a condition memory location corresponding to the one of the plurality of conditions (e.g., condition evaluation memory 604) and increment the dynamic counter by one and set a dynamic flag to one indicating the one of the plurality of conditions is dynamic in response to determining that the first bit of the plurality of condition instructions is a one. Nevertheless, it should be appreciated that other ways of distinguishing the dynamic condition may be used instead.

The conditions are evaluated in condition machine 600. Example code for (VREADSTC_V &~F_S1_RD) condition evaluation is given below in subroutine (VREADSTC_V &~F_S1_RD):

```
load R0 F_S1_RD
XOR R0 'd1
load R1 VREADSTC_V
AND R1 R0
movr R_result R1
```

This code is executed first time when the memory operation command (e.g., READ command) is received. So, for dynamic re-evaluation, the address of the first instruction (e.g., load R0 F_S1_RD) is stored along with address, the length of instruction (e.g., cd5) and the condition index and mapped to the corresponding dynamic signal (e.g., VREADSTC_V).

The microcontroller 150 sets the dynamic flag to zero indicating the one of the plurality of conditions is not dynamic in response to determining that the first bit of the plurality of condition instructions is nota one. In addition, the microcontroller 150 is configured to determine the condition value of the one of the plurality of conditions using the one of the plurality of condition instructions and return to reading one of the plurality of condition instructions associated with one of the plurality of conditions from the condition evaluation memory 604. The microcontroller 150 then outputs the condition value of the one of the plurality of conditions and the dynamic flag.

Figure 7:
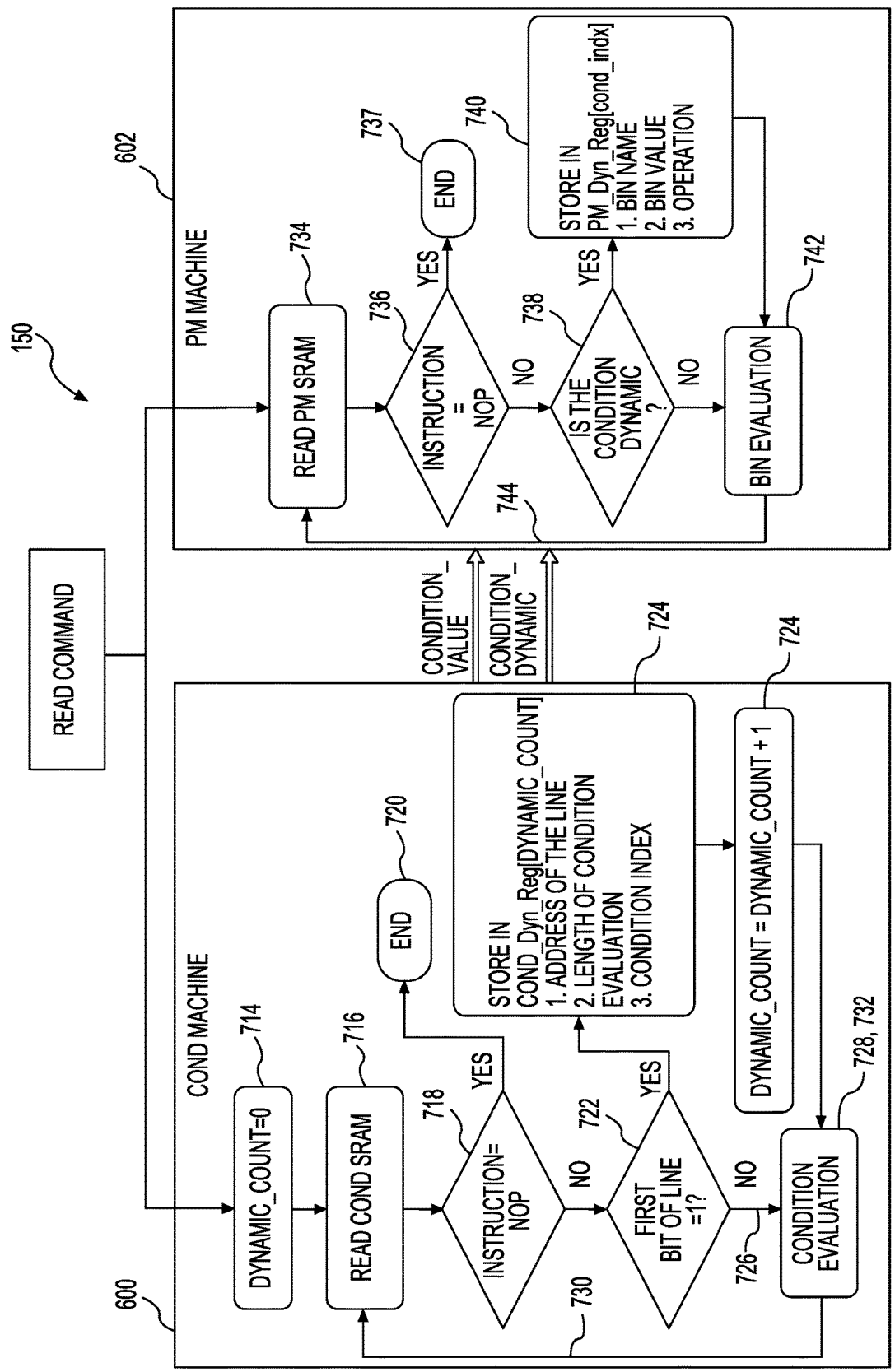
FIGS. 7-9 show operation of the condition machine and the parameter management machine and steps of a method of operating the microcontroller of the non-volatile memory apparatus according to aspects of the disclosure.

Looking at the determining and outputting the output value using the condition value using the microcontroller 150 in more detail, the microcontroller 150 also carries out additional steps shown in FIG. 7 (e.g., as part of the parameter management machine 602 operating in parallel with the condition machine 600, as described above). So, the microcontroller 150 is further configured to read one of a plurality of parameter instructions associated with one of the plurality of conditions from a parameter management memory 606 in response to receiving the memory operation command. The microcontroller 150 also determines whether the one of the plurality of parameter instructions is a parameter end operation and ending parameter evaluation in response to determining that the one of the plurality of parameter instructions is a parameter end operation. The microcontroller 150 is configured to receive the dynamic flag and determining whether the one of the plurality of conditions is dynamic based on the dynamic flag.

During the first-time execution to determine the BIN or output value, the value that needs to be added/subtracted for each dynamic condition is stored in: 1) Bin or output name: indicates which BIN needs to be updated, 2) BIN or output value: the value that needs to be added/subtracted, and 3) Opcode or arithmetic operation: addition or subtraction. Therefore, the microcontroller 150 additionally stores an output name and an output offset and an arithmetic operation associated with the one of the plurality of conditions in a parameter memory location 607 corresponding to the one of the plurality of conditions in response to determining that one of the plurality of conditions is dynamic. The microcontroller 150 is also configured to determine an output value using the one of the plurality of parameter instructions and return to reading one of the plurality of parameter instructions associated with one of the plurality of conditions from the parameter evaluation memory. The microcontroller 150 next outputs the output value.

Figure 8:
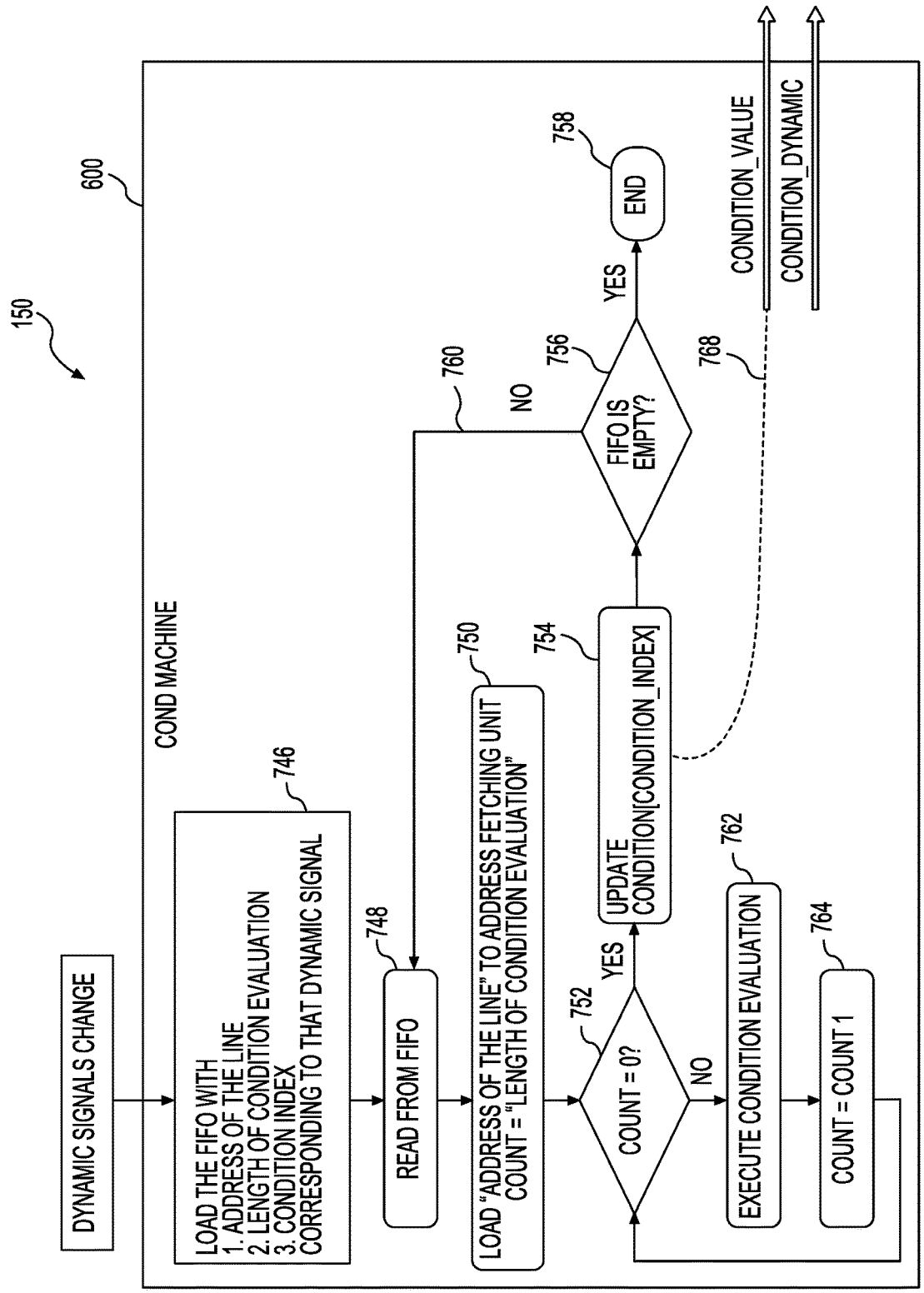

Referring to FIG. 8, after the initial execution of all the conditions, any change in the dynamic signals or conditions are constantly monitored. This is done by doing an exclusive or (XOR) of the current value of the dynamic signal or condition with the stored value. Whenever there is any change in a dynamic condition (e.g., VREADSTC_V), then the corresponding dynamic address is loaded into the address fetching unit. Then, the address will be incremented as many times as the length of instruction. The instructions related to the particular condition is executed. The resultant condition value is updated in the condition register [dynamic condition index] (e.g., condition evaluation memory 604).

So, the microcontroller 150 is configured to carry out additional steps (e.g., using the condition machine 600) as part of the determining the updated condition value of one of the plurality of conditions identified as dynamic. In more detail, the microcontroller 150 is configured to store a starting change address or dynamic address and a number of change lines (i.e., length of instruction) to execute and a change condition identifier (i.e., condition register) associated with the one of the plurality of conditions identified as dynamic in a condition buffer 608. The condition buffer 608 can, for example be a first in first out (FIFO) type buffer. The FIFO is used in between dynamic signal detection and loading address fetching unit, to take care of the condition where more than one dynamic signal or condition can change at a time.

Additionally, the microcontroller 150 is configured to read the starting change address and the number of change lines to execute and the condition identifier associated with the one of the plurality of conditions identified as dynamic from the condition buffer 608. The microcontroller 150 loads the starting change address to the address fetching unit and sets a dynamic counter to the number of change lines to execute. The microcontroller 150 then determines whether the dynamic change counter is equal to zero. The microcontroller 150 is configured to update the updated condition value for the one of the plurality of conditions identified as dynamic in response to determining that the dynamic change counter is equal to zero. The microcontroller 150 next determines whether the condition buffer 608 is empty and ends condition evaluation in response to determining the condition buffer 608 is empty. The microcontroller 150 is configured to return to reading the starting change address and the number of change lines to execute and the condition identifier associated with the one of the plurality of conditions identified as dynamic from the condition buffer 608 in response to determining the condition buffer 608 is not empty. The microcontroller 150 is also configured to determine the updated condition value of the one of the plurality of conditions identified as dynamic using the one of the plurality of condition instructions and reduce the dynamic change counter by one and return to determining whether the dynamic change counter is equal to zero in response to determining that the dynamic change counter is not equal to zero. The microcontroller 150 then outputs the updated condition value for the one of the plurality of conditions identified as dynamic. Thus, for the determining the updated condition value of one of the plurality of conditions identified as dynamic, the microcontroller 150 is further configured to determine the updated condition value of the one of the plurality of conditions identified as dynamic by executing the number of a plurality of condition instructions defined by the number of lines to execute and beginning at the starting address.

Figure 9:
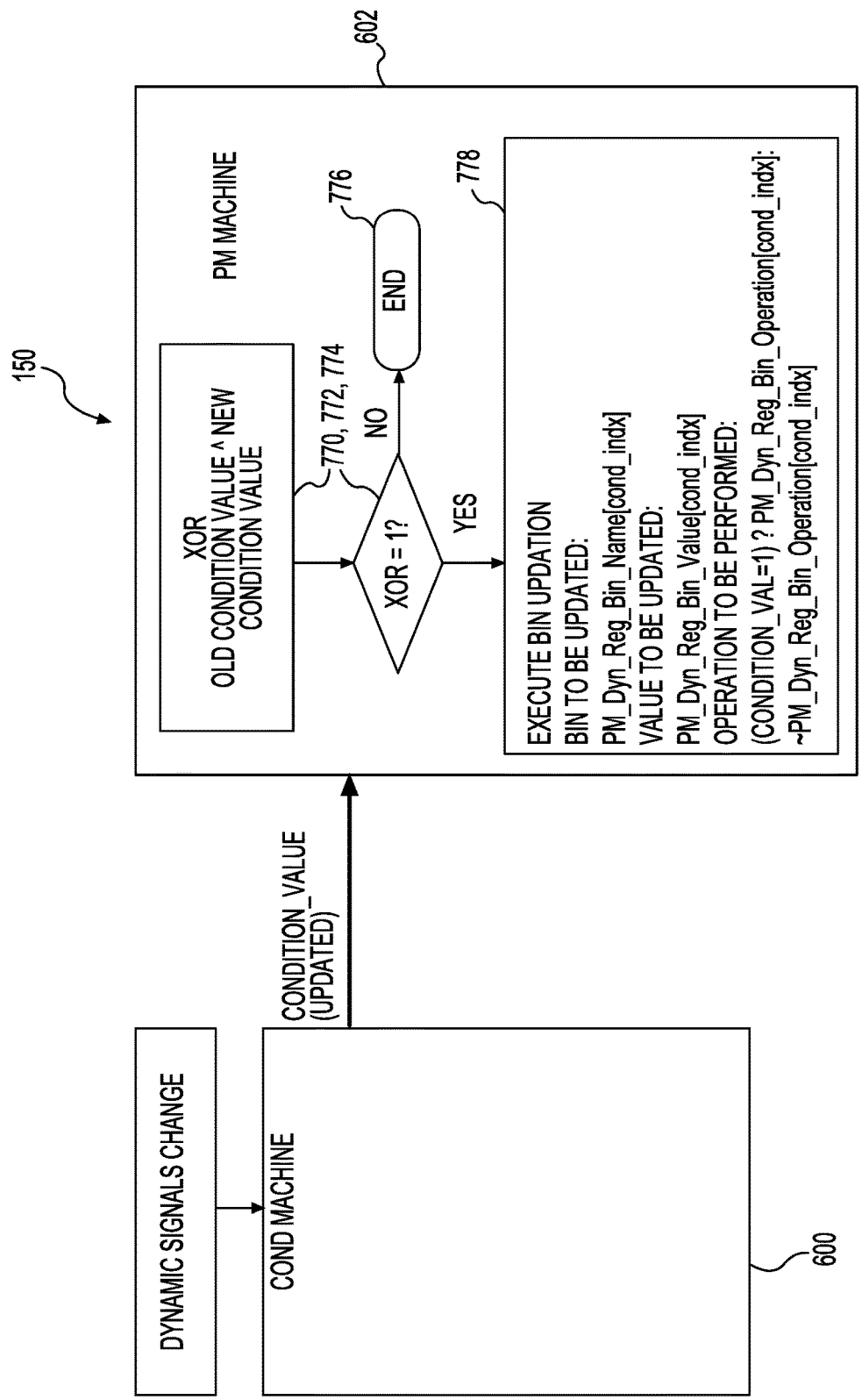

Once a condition value is changed, then the output value needs to be updated. Thus, referring to FIG. 9, the microcontroller 150 is configured to carry out additional steps (e.g., using the parameter management machine 602) as part of the comparing the condition value and the updated condition value. Specifically, the microcontroller 150 is further configured to receive the updated condition value for the one of the plurality of conditions identified as dynamic. The microcontroller 150 is also configured to determine whether the updated condition value and the condition value are different by performing a comparison of the condition value and the updated condition value of the one of the plurality of conditions. Such a step can include performing an exclusive or logic operation with the condition value and the updated condition value of the one of the plurality of conditions (each of the plurality of conditions is binary and is either a logical one or a logical zero). So, to determine the change in the condition value, the old value of condition is stored and exored with the new condition value. Whenever the exclusive or (XOR) output is high, then the values stored in dynamic register set of that condition is executed.

In addition, for the determining and outputting the updated output value using the updated condition value and the comparison of the condition value and the updated condition value, the microcontroller 150 is configured to end parameter evaluation in response to determining the updated condition value and the condition value are not different. The microcontroller 150 then determines an updated output value using the output offset and the arithmetic operation associated with the one of the plurality of conditions in the parameter memory location 607 corresponding to the one of the plurality of conditions and based on the updated condition value and the condition value in response to determining the updated condition value and the condition value are different. The arithmetic operation is based on the comparison of the condition value and the updated condition value.

Thus, the operation performed on the output value or BIN depends on the value of condition and the opcode or arithmetic operation stored. If the condition value has changed from 0 to 1, then the operation is performed according to the stored dynamic opcode (PM_Dyn_Reg_Bin_Operation[cond_indx]). For example, if the arithmetic operation or opcode is addition, then the offset is added to the output value and if opcode is subtraction, then the offset value is deducted from the output value.

If condition value changed from 1 to 0, then reverse operation is performed. For example, if the opcode is addition, then the offset is deducted from output value and if opcode is subtraction, then the offset value is added to the output value. This is necessary because the direct opcode was executed when the condition value was 1. Now since condition value has changed back to 0, the reverse operation is required to nullify the change in output value due to the condition value 1.

Figure 10:
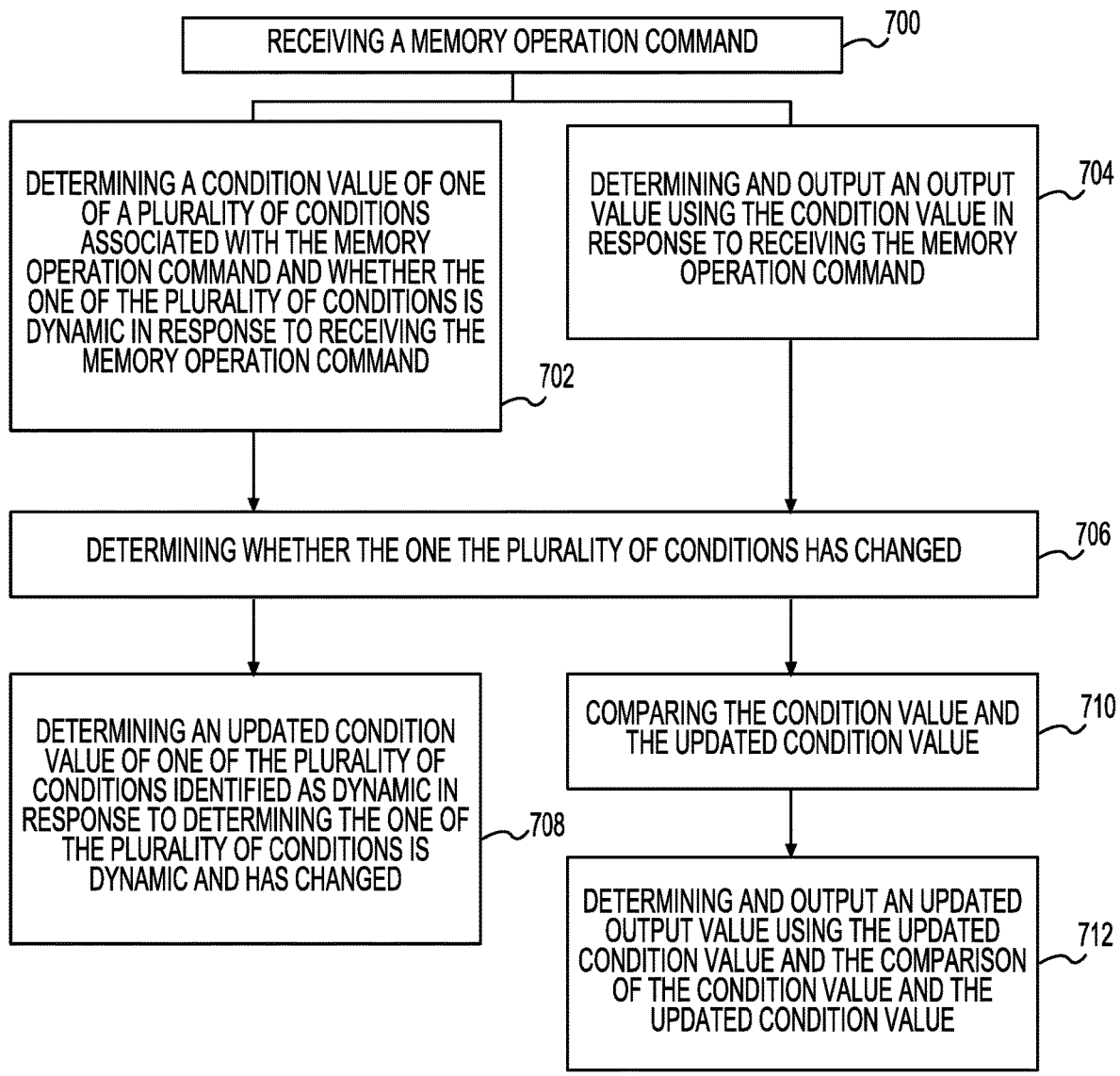
FIG. 10 illustrates additional steps of the method of operating the microcontroller of the non-volatile memory apparatus according to aspects of the disclosure.

Initially referring to FIG. 10, a method of operating an on-die memory microcontroller 150 is also provided. The method begins with the step of 700 receiving a memory operation command. For example, a read request, a write/program request, an erase request, or the like for the memory array 200 of the integrated circuit device 123. In response to receiving the memory operation command, the method proceeds by 702 determining a condition value of one of a plurality of conditions associated with the memory operation command and whether the one of the plurality of conditions is dynamic. In parallel, the method includes the step of 704 determining and outputting an output value using the condition value. The method continues with the step of 706 determining whether the one the plurality of conditions has changed. In response to determining the one of the plurality of conditions is dynamic and has changed, the next step of the method is 708 determining an updated condition value of one of the plurality of conditions identified as dynamic. In parallel, the method includes the steps of 710 comparing the condition value and the updated condition value and 712 determining and output an updated output value using the updated condition value and the comparison of the condition value and the updated condition value.

In more detail, the step of 702 determining the condition value of one of the plurality of conditions associated with the memory operation command and whether the one of the plurality of conditions is dynamic can include additional steps. Specifically, referring back to FIG. 7, this step can include the step of 714 setting a dynamic counter to zero in response to receiving the memory operation command. Next, 716 reading one of a plurality of condition instructions associated with one of the plurality of conditions from a condition evaluation memory 604. The method can continue with the steps of 718 determining whether the one of the plurality of condition instructions is a condition end operation and 720 ending condition evaluation in response to determining that the one of the plurality of condition instructions is a condition end operation. The method proceeds with the step of 722 determining whether the first bit of the one of the plurality of condition instructions is a one in response to determining that the plurality of condition instructions is not an end operation. The next step of the method is 724 storing a starting address and a number of lines to execute and a condition identifier associated with the one of the plurality of condition instructions in a condition memory location corresponding to the one of the plurality of conditions and incrementing the dynamic counter by one and setting a dynamic flag to one indicating the one of the plurality of conditions is dynamic in response to determining that the first bit of the plurality of condition instructions is a one. The method then includes the step of 726 setting the dynamic flag to zero indicating the one of the plurality of conditions is not dynamic in response to determining that the first bit of the plurality of condition instructions is not a one. The method continues with the step of 728 determining the condition value of the one of the plurality of conditions using the one of the plurality of condition instructions and 730 returning to reading one of the plurality of condition instructions associated with one of the plurality of conditions from the condition evaluation memory 604. The method proceeds by 732 outputting the condition value of the one of the plurality of conditions and the dynamic flag.

The step of 704 determining and outputting the output value using the condition value can also include numerous steps. More specifically, still referring to FIG. 7, the method can include the step of 734 reading one of a plurality of parameter instructions associated with one of the plurality of conditions from a parameter management memory 606 in response to receiving the memory operation command. Then, the method can continue with the step of 736 determining whether the one of the plurality of parameter instructions is a parameter end operation and 737 ending parameter evaluation in response to determining that the one of the plurality of parameter instructions is a parameter end operation. The method continues with the step of 738 receiving the dynamic flag and determining whether the one of the plurality of conditions is dynamic based on the dynamic flag. The method then includes the step of 740 storing an output name and an output offset and an arithmetic operation associated with the one of the plurality of conditions in a parameter memory location 607 corresponding to the one of the plurality of conditions in response to determining that one of the plurality of conditions is dynamic. Next, 742 determining an output value using the one of the plurality of parameter instructions and 744 return to reading one of the plurality of parameter instructions associated with one of the plurality of conditions from the parameter evaluation memory and outputting the output value.

The step of 706 determining the updated condition value of one of the plurality of conditions can include the step of 746 storing a starting change address and a number of change lines to execute and a change condition identifier associated with the one of the plurality of conditions identified as dynamic in a condition buffer 608. The condition buffer 608 can, for example, be a first in first out type buffer. The next step of the method is 748 reading the starting change address and the number of change lines to execute and the condition identifier associated with the one of the plurality of conditions identified as dynamic from the condition buffer 608. Then, the method includes the step of 750 loading the starting change address to an address fetching unit and set a dynamic counter to the number of change lines to execute. The method proceeds by 752 determining whether the dynamic change counter is equal to zero and 754 updating the updated condition value for the one of the plurality of conditions identified as dynamic in response to determining that the dynamic change counter is equal to zero. The method also includes the step of 756 determining whether the condition buffer 608 is empty. The method continues by 758 ending condition evaluation in response to determining the condition buffer 608 is empty. The next step of the method is 760 returning to reading the starting change address and the number of change lines to execute and the condition identifier associated with the one of the plurality of conditions identified as dynamic from the condition buffer 608 in response to determining the condition buffer 608 is not empty. The method continues with the step of 762 determining the updated condition value of the one of the plurality of conditions identified as dynamic using the one of the plurality of condition instructions and 764 reducing the dynamic change counter by one and 766 returning to determining whether the dynamic change counter is equal to zero in response to determining that the dynamic change counter is not equal to zero. Then, the next step of the method is 768 outputting the updated condition value for the one of the plurality of conditions identified as dynamic.

Referring back to FIG. 9, the step of 710 comparing the condition value and the updated condition value includes the step of 770 receiving the updated condition value for the one of the plurality of conditions identified as dynamic. The method continues with the step of 772 determining whether the updated condition value and the condition value are different by performing a comparison of the condition value and the updated condition value of the one of the plurality of conditions. The step of performing the comparison of the condition value and the updated condition value of the one of the plurality of conditions can include the step of 774 performing an exclusive or logic operation with the condition value and the updated condition value of the one of the plurality of conditions.

The step of 712 determining and outputting the updated output value using the updated condition value and the comparison of the condition value and the updated condition value includes the step of 776 ending parameter evaluation in response to determining the updated condition value and the condition value are not different. Next, 778 determining an updated output value using the output offset and the arithmetic operation associated with the one of the plurality of conditions in the parameter memory location 607 corresponding to the one of the plurality of conditions and based on the updated condition value and the condition value in response to determining the updated condition value and the condition value are different.

Because of the disclosed microcontroller-based design, rather than combinational blocks, changes can be made if needed after the non-volatile memory apparatus 500 has been manufactured without needing to do all layer tape out for fixing minor issues. With such a firmware-based architecture, speed, memory and power are the key concerns. So the disclosed apparatus 500 provides no timing penalty and no timing violations due to the parallel operation (e.g., of the condition machine 600 and parameter management machine 602). The code has a comparatively low memory footprint in random access memory (RAM)/read only memory (ROM) (e.g., approximately 2 kilobytes). The power consumed is very low (e.g., 0.1 milliamperes), since most of the code can reside in ROM.

Clearly, changes may be made to what is described and illustrated herein without, however, departing from the scope defined in the accompanying claims. The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom", and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptions used herein interpreted accordingly.

What is claimed is:

1. An apparatus, comprising:
   a plurality of non-volatile memory cells in an integrated circuit device; and
   a microcontroller in the integrated circuit device and in communication with the plurality of non-volatile memory cells and configured to:
   receive a memory operation command,
   in response to receiving the memory operation command:
      determine a condition value of one of a plurality of conditions associated with the memory operation command and whether the one of the plurality of conditions is dynamic and in parallel:
         determine and output an output value using the condition value,
   determine whether the one the plurality of conditions has changed,
   in response to determining the one of the plurality of conditions is dynamic and has changed:
      determine an updated condition value of one of the plurality of conditions identified as dynamic
         compare the condition value and the updated condition value, and
         determine and output an updated output value using the updated condition value and the comparison of the condition value and the updated condition value.

2. The apparatus as set forth in claim 1, wherein, for the determining the condition value of one of the plurality of conditions associated with the memory operation command and whether the one of the plurality of conditions is dynamic, the microcontroller is further configured to:
   set a dynamic counter to zero in response to receiving the memory operation command;
   read one of a plurality of condition instructions associated with one of the plurality of conditions from a condition evaluation memory;
   determine whether the one of the plurality of condition instructions is a condition end operation;
   end condition evaluation in response to determining that the one of the plurality of condition instructions is a condition end operation;
   determine whether the first bit of the one of the plurality of condition instructions is a one in response to determining that the plurality of condition instructions is not an end operation;
   store a starting address and a number of lines to execute and a condition identifier associated with the one of the plurality of condition instructions in a condition memory location corresponding to the one of the plurality of conditions and increment the dynamic counter by one and set a dynamic flag to one indicating the one of the plurality of conditions is dynamic in response to determining that the first bit of the plurality of condition instructions is a one;
   set the dynamic flag to zero indicating the one of the plurality of conditions is not dynamic in response to determining that the first bit of the plurality of condition instructions is not a one;
   determine the condition value of the one of the plurality of conditions using the one of the plurality of condition instructions and return to reading one of the plurality of condition instructions associated with one of the plurality of conditions from the condition evaluation memory;
   output the condition value of the one of the plurality of conditions and the dynamic flag.

3. The apparatus as set forth in claim 2, wherein for the determining and outputting the output value using the condition value, the microcontroller is further configured to:
  read one of a plurality of parameter instructions associated with one of the plurality of conditions from a parameter management memory in response to receiving the memory operation command;
  determine whether the one of the plurality of parameter instructions is a parameter end operation and ending parameter evaluation in response to determining that the one of the plurality of parameter instructions is a parameter end operation;
  receive the dynamic flag and determining whether the one of the plurality of conditions is dynamic based on the dynamic flag;
  store an output name and an output offset and an arithmetic operation associated with the one of the plurality of conditions in a parameter memory location corresponding to the one of the plurality of conditions in response to determining that one of the plurality of conditions is dynamic;
  determine an output value using the one of the plurality of parameter instructions and return to reading one of the plurality of parameter instructions associated with one of the plurality of conditions from the parameter evaluation memory;
  output the output value.

4. The apparatus as set forth in claim 3, wherein for the determining the updated condition value of one of the plurality of conditions identified as dynamic, the microcontroller is further configured to:
  store a starting change address and a number of change lines to execute and a change condition identifier associated with the one of the plurality of conditions identified as dynamic in a condition buffer;
  read the starting change address and the number of change lines to execute and the condition identifier associated with the one of the plurality of conditions identified as dynamic from the condition buffer;
  load the starting change address to an address fetching unit and set a dynamic counter to the number of change lines to execute;
  determine whether the dynamic change counter is equal to zero;
  update the updated condition value for the one of the plurality of conditions identified as dynamic in response to determining that the dynamic change counter is equal to zero;
  determine whether the condition buffer is empty;
  ending condition evaluation in response to determining the condition buffer is empty;
  return to reading the starting change address and the number of change lines to execute and the condition identifier associated with the one of the plurality of conditions identified as dynamic from the condition buffer in response to determining the condition buffer is not empty;
  determine the updated condition value of the one of the plurality of conditions identified as dynamic using the one of the plurality of condition instructions and reduce the dynamic change counter by one and return to determining whether the dynamic change counter is equal to zero in response to determining that the dynamic change counter is not equal to zero;
  output the updated condition value for the one of the plurality of conditions identified as dynamic.

5. The apparatus as set forth in claim 4, wherein the condition buffer is a first in first out type buffer.

6. The apparatus as set forth in claim 4, wherein for the comparing the condition value and the updated condition value, the microcontroller is further configured to:
  receive the updated condition value for the one of the plurality of conditions identified as dynamic; and
  determine whether the updated condition value and the condition value are different by performing a comparison of the condition value and the updated condition value of the one of the plurality of conditions.

7. The apparatus as set forth in claim 6, wherein for the performing the comparison of the condition value and the updated condition value of the one of the plurality of conditions, the microcontroller is further configured to performing an exclusive or logic operation with the condition value and the updated condition value of the one of the plurality of conditions.

8. The apparatus as set forth in claim 6, wherein for the determining and outputting the updated output value using the updated condition value and the comparison of the condition value and the updated condition value, the microcontroller is further configured to:
  end parameter evaluation in response to determining the updated condition value and the condition value are not different; and
  determine an updated output value using the output offset and the arithmetic operation associated with the one of the plurality of conditions in the parameter memory location corresponding to the one of the plurality of conditions and based on the updated condition value and the condition value in response to determining the updated condition value and the condition value are different.

9. A controller in communication with a plurality of non-volatile memory cells of a non-volatile memory system, the controller configured to:
  receive a memory operation command;
  monitor a plurality of conditions associated with the memory operation command;
  in response to receiving the memory operation command:
    determine a condition value of one of a plurality of conditions and whether the one of the plurality of conditions is dynamic,
    determine and output an output value using the condition value during the determining of the condition value of one of the plurality of conditions and whether the one of the plurality of conditions is dynamic,
  determine whether the one the plurality of conditions has changed;
  in response to determining the one of the plurality of conditions is dynamic and has changed:
    determine an updated condition value of one of the plurality of conditions identified as dynamic,
    during the determining of the updated condition value of the one of the plurality of conditions identified as dynamic:
      compare the condition value and the updated condition value, and
      determine and output an updated output value using the updated condition value and the comparison of the condition value and the updated condition value.

10. The controller as set forth in claim 9, wherein each of the plurality of non-volatile memory cells includes a control gate in communication with one of a plurality of word lines and the controller is coupled with a power control circuit configured to provide a plurality of word line voltages to each of the plurality of word lines for the memory operation command and the output value from the controller is a digital value provided to the power control circuit corresponding to one of the plurality of word line voltages.

11. The controller as set forth in claim 9, wherein for the determining a condition value of one of a plurality of conditions and whether the one of the plurality of conditions is dynamic the controller is further configured to store a starting address and a number of lines to execute and a condition identifier associated with the one of the plurality of condition instructions in a condition memory location corresponding to the one of the plurality of conditions in response to determining that the one of the plurality of conditions is dynamic and wherein for the determining the updated condition value of one of the plurality of conditions identified as dynamic, the controller is further configured to determine the updated condition value of the one of the plurality of conditions identified as dynamic by executing the number of a plurality of condition instructions defined by the number of lines to execute and beginning at the starting address.

12. The controller as set forth in claim 9, wherein each of the plurality of conditions is binary being either a logical one or a logical zero and the controller is further configured to store an output name and an output offset and an arithmetic operation associated with the one of the plurality of conditions in a parameter memory location corresponding to the one of the plurality of conditions in response to determining that one of the plurality of conditions is dynamic and wherein for determining and outputting the updated output value using the updated condition value and the comparison of the condition value and the updated condition value, the controller is further configured to determine the updated output value using the output offset and the arithmetic operation associated with the one of the plurality of conditions in the parameter memory location corresponding to the one of the plurality of conditions, wherein the arithmetic operation is based on the comparison of the condition value and the updated condition value.

13. A method of operating a microcontroller of a non-volatile memory system, the method comprising the steps of:
receiving a memory operation command,
in response to receiving the memory operation command:
determining a condition value of one of a plurality of conditions associated with the memory operation command and whether the one of the plurality of conditions is dynamic and in parallel:
determining and outputting an output value using the condition value,
determining whether the one the plurality of conditions has changed,
in response to determining the one of the plurality of conditions is dynamic and has changed:
determining an updated condition value of one of the plurality of conditions identified as dynamic
comparing the condition value and the updated condition value, and
determining and output an updated output value using the updated condition value and the comparison of the condition value and the updated condition value.

14. The method as set forth in claim 13, wherein, the step of determining the condition value of one of the plurality of conditions associated with the memory operation command and whether the one of the plurality of conditions is dynamic includes the steps of:
setting a dynamic counter to zero in response to receiving the memory operation command;
reading one of a plurality of condition instructions associated with one of the plurality of conditions from a condition evaluation memory;
determining whether the one of the plurality of condition instructions is a condition end operation;
ending condition evaluation in response to determining that the one of the plurality of condition instructions is a condition end operation;
determining whether the first bit of the one of the plurality of condition instructions is a one in response to determining that the plurality of condition instructions is not an end operation;
storing a starting address and a number of lines to execute and a condition identifier associated with the one of the plurality of condition instructions in a condition memory location corresponding to the one of the plurality of conditions and incrementing the dynamic counter by one and setting a dynamic flag to one indicating the one of the plurality of conditions is dynamic in response to determining that the first bit of the plurality of condition instructions is a one;
setting the dynamic flag to zero indicating the one of the plurality of conditions is not dynamic in response to determining that the first bit of the plurality of condition instructions is not a one;
determining the condition value of the one of the plurality of conditions using the one of the plurality of condition instructions and returning to reading one of the plurality of condition instructions associated with one of the plurality of conditions from the condition evaluation memory;
outputting the condition value of the one of the plurality of conditions and the dynamic flag.

15. The method as set forth in claim 14, wherein the step of determining and outputting the output value using the condition value, includes the steps of:
reading one of a plurality of parameter instructions associated with one of the plurality of conditions from a parameter management memory in response to receiving the memory operation command;
determining whether the one of the plurality of parameter instructions is a parameter end operation and ending parameter evaluation in response to determining that the one of the plurality of parameter instructions is a parameter end operation;
receiving the dynamic flag and determining whether the one of the plurality of conditions is dynamic based on the dynamic flag;
storing an output name and an output offset and an arithmetic operation associated with the one of the plurality of conditions in a parameter memory location corresponding to the one of the plurality of conditions in response to determining that one of the plurality of conditions is dynamic;
determining an output value using the one of the plurality of parameter instructions and return to reading one of the plurality of parameter instructions associated with one of the plurality of conditions from the parameter evaluation memory;
outputting the output value.

16. The method as set forth in claim 15, wherein the step of determining the updated condition value of one of the plurality of conditions includes the steps of:
- storing a starting change address and a number of change lines to execute and a change condition identifier associated with the one of the plurality of conditions identified as dynamic in a condition buffer;
- reading the starting change address and the number of change lines to execute and the condition identifier associated with the one of the plurality of conditions identified as dynamic from the condition buffer;
- loading the starting change address to an address fetching unit and set a dynamic counter to the number of change lines to execute;
- determining whether the dynamic change counter is equal to zero;
- updating the updated condition value for the one of the plurality of conditions identified as dynamic in response to determining that the dynamic change counter is equal to zero;
- determining whether the condition buffer is empty;
- ending condition evaluation in response to determining the condition buffer is empty;
- returning to reading the starting change address and the number of change lines to execute and the condition identifier associated with the one of the plurality of conditions identified as dynamic from the condition buffer in response to determining the condition buffer is not empty;
- determining the updated condition value of the one of the plurality of conditions identified as dynamic using the one of the plurality of condition instructions and reduce the dynamic change counter by one and return to determining whether the dynamic change counter is equal to zero in response to determining that the dynamic change counter is not equal to zero;
- outputting the updated condition value for the one of the plurality of conditions identified as dynamic.

17. The method as set forth in claim 16, wherein the condition buffer is a first in first out type buffer.

18. The method as set forth in claim 16, wherein the step of comparing the condition value and the updated condition value includes the steps of:
- receiving the updated condition value for the one of the plurality of conditions identified as dynamic; and
- determining whether the updated condition value and the condition value are different by performing a comparison of the condition value and the updated condition value of the one of the plurality of conditions.

19. The method as set forth in claim 18, wherein for the step of performing the comparison of the condition value and the updated condition value of the one of the plurality of conditions includes the step of performing an exclusive or logic operation with the condition value and the updated condition value of the one of the plurality of conditions.

20. The method as set forth in claim 19, wherein the step of determining and outputting the updated output value using the updated condition value and the comparison of the condition value and the updated condition value includes the steps of:
- ending parameter evaluation in response to determining the updated condition value and the condition value are not different; and
- determining an updated output value using the output offset and the arithmetic operation associated with the one of the plurality of conditions in the parameter memory location corresponding to the one of the plurality of conditions and based on the updated condition value and the condition value in response to determining the updated condition value and the condition value are different.

* * * * *